United States Patent
Nam et al.

(10) Patent No.: US 12,352,881 B2
(45) Date of Patent: Jul. 8, 2025

(54) METHOD AND ELECTRONIC DEVICE FOR RETRIEVING EXTERNAL DEVICE THROUGH POSITIONING ANGLE ADJUSTMENT

(71) Applicant: SAMSUNG ELECTRONICS CO., LTD., Suwon-si (KR)

(72) Inventors: Myeonghwan Nam, Suwon-si (KR); Doosuk Kang, Suwon-si (KR); Moonseok Kang, Suwon-si (KR); Hyunchul Kim, Suwon-si (KR); Jiho Shin, Suwon-si (KR); Yi Yang, Suwon-si (KR); Jonghoon Jang, Suwon-si (KR); Kunyoung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 17/900,357

(22) Filed: Aug. 31, 2022

(65) Prior Publication Data

US 2023/0108615 A1    Apr. 6, 2023

Related U.S. Application Data

(63) Continuation of application No. PCT/KR2022/011872, filed on Aug. 9, 2022.

(30) Foreign Application Priority Data

Oct. 6, 2021   (KR) .................. 10-2021-0132258
Jan. 12, 2022  (KR) .................. 10-2022-0004694

(51) Int. Cl.
    G01S 5/04    (2006.01)
    H04B 1/7163 (2011.01)

(52) U.S. Cl.
    CPC .............. G01S 5/04 (2013.01); H04B 1/7163 (2013.01)

(58) Field of Classification Search
    CPC ........................ G01S 5/04; H04B 1/7163
    (Continued)

(56) References Cited

U.S. PATENT DOCUMENTS 8,611,610 B2 * 12/2013 Park ................. G06T 7/521
                                                 250/214 R
9,582,990 B2    2/2017 Peng
(Continued)

FOREIGN PATENT DOCUMENTS

CN    111132028 A    5/2020
CN    113296053 A    8/2021
(Continued)

OTHER PUBLICATIONS

International Search Report (PCT/ISA/210) issued Nov. 14, 2022 by the International Searching Authority in counterpart International Patent Application No. PCT/KR2022/011872.
(Continued)

*Primary Examiner* — Kerri L McNally
(74) *Attorney, Agent, or Firm* — Sughrue Mion, PLLC

(57) ABSTRACT

Various embodiments of the disclosure disclose a method and a device including a display, a communication module, a memory, and a processor configured to be operatively connected to at least one of the display, the communication module, or the memory. The processor may be configured to perform ultra-wideband (UWB) communication through the communication module, retrieve at least one external device corresponding to a perceivable range of the UWB communication, based at least in part on the UWB communication, determine whether a configured condition is satisfied by a retrieved external device of the retrieved one or more
(Continued)

external devices, perform an operation related to the retrieved external device when the retrieved external device satisfies the configured condition, and re-retrieve the at least one external device by changing the positioning angle when the retrieved external device does not correspond to the configured condition. Various embodiments are possible.

18 Claims, 25 Drawing Sheets

(58) Field of Classification Search
USPC .................................................. 340/539.21
See application file for complete search history.

(56) References Cited

U.S. PATENT DOCUMENTS

| | | |
|---|---|---|
| 2008/0311944 A1 | 12/2008 | Hansen et al. |
| 2010/0311333 A1 | 12/2010 | Rofougaran et al. |
| 2011/0205969 A1 | 8/2011 | Ahmad et al. |
| 2014/0341585 A1 | 11/2014 | Lee |
| 2018/0091947 A1* | 3/2018 | Shirakata ............... H04B 7/088 |
| 2018/0372832 A1* | 12/2018 | Ko ......................... G01S 13/84 |
| 2019/0096234 A1 | 3/2019 | Yoon et al. |
| 2020/0355783 A1* | 11/2020 | Yuan ..................... G01S 5/0221 |
| 2020/0372789 A1* | 11/2020 | Norris ..................... G06V 20/20 |
| 2021/0088616 A1* | 3/2021 | Hsieh ........................ G01S 1/68 |
| 2021/0385623 A1* | 12/2021 | Wang ..................... H04W 4/029 |
| 2022/0141617 A1* | 5/2022 | Kao ...................... G01S 5/0215 |
| | | 455/456.1 |
| 2022/0390546 A1* | 12/2022 | Cha ........................... G01S 5/04 |
| 2023/0143640 A1 | 5/2023 | Hua et al. |

FOREIGN PATENT DOCUMENTS

| | | |
|---|---|---|
| CN | 111432331 B | 10/2021 |
| KR | 10-1623162 B1 | 5/2016 |
| KR | 10-2017-0073169 A | 6/2017 |
| KR | 10-2019-0033758 A | 4/2019 |

OTHER PUBLICATIONS

Written Opinion (PCT/ISA/237) issued Nov. 14, 2022 by the International Searching Authority in counterpart International Patent Application No. PCT/KR2022/011872.
Communication issued on Apr. 9, 2024 by the European Patent Office for European Patent Application No. 22878700.8.
Communication dated Apr. 7, 2025, issued by the European Patent Office in European Application No. 22878700.8.

* cited by examiner

FIG. 6A
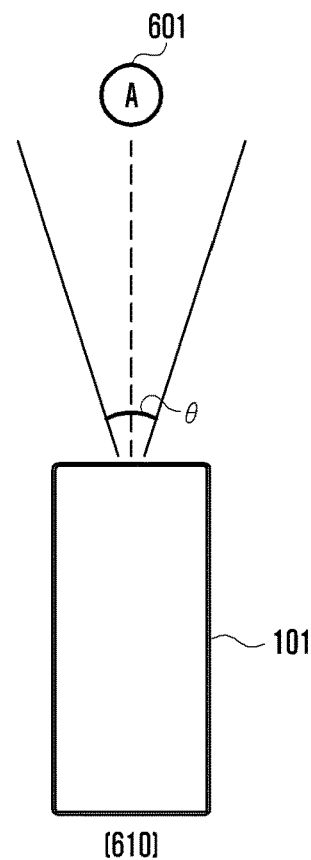
[610]
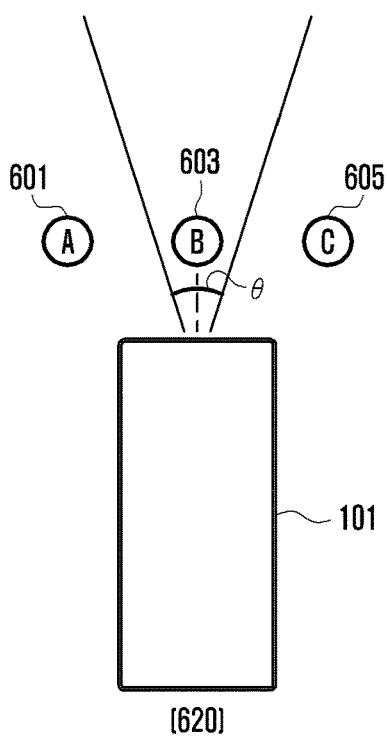
[620]
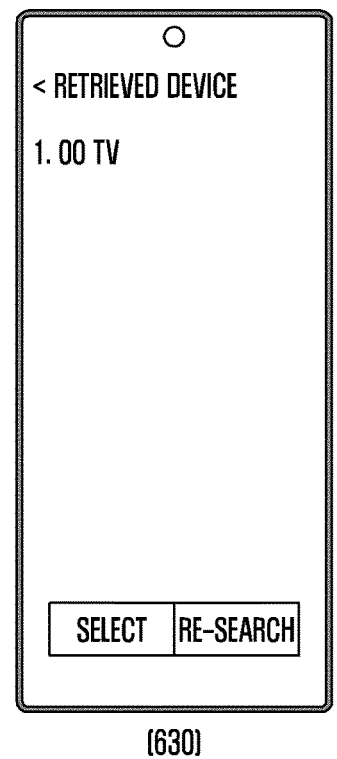
[630]

FIG. 6B
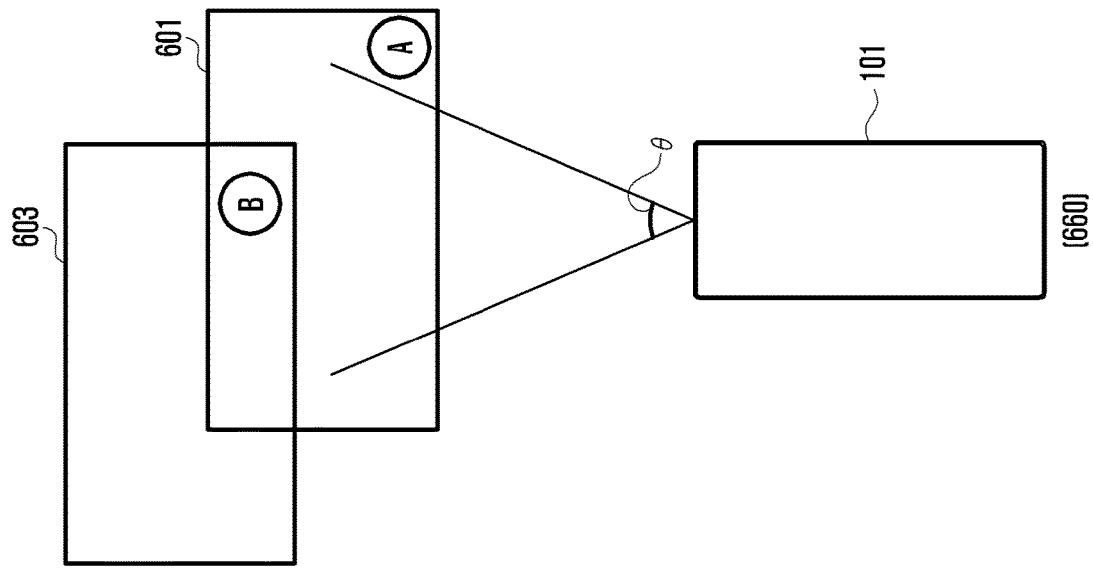
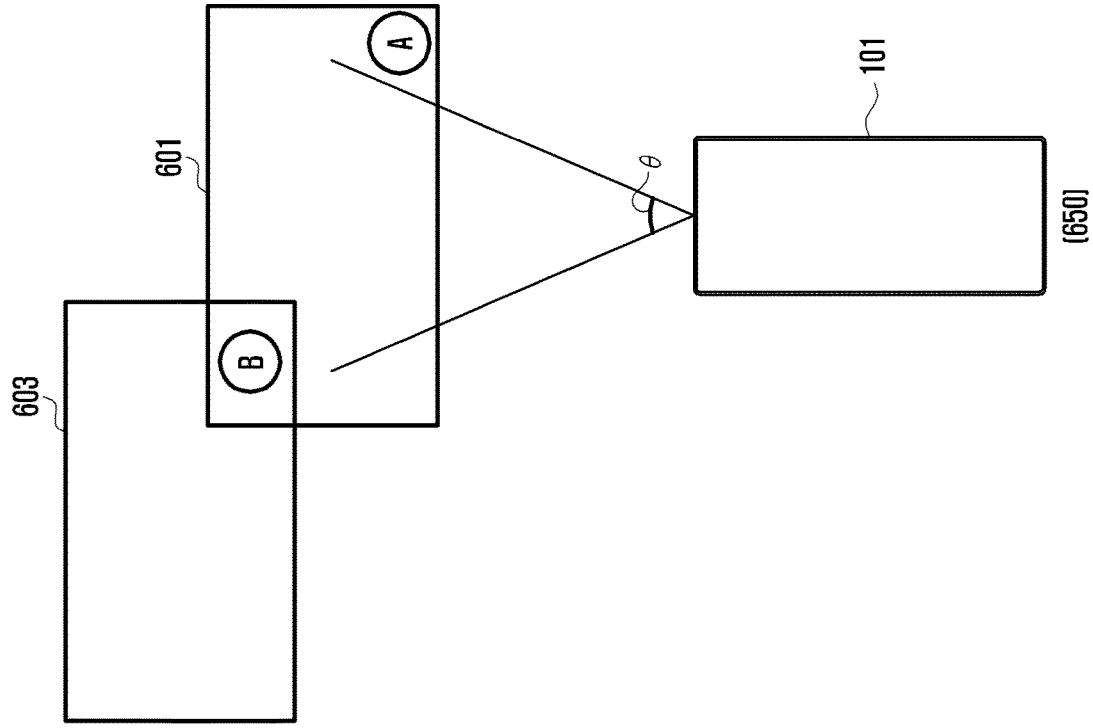

FIG. 8A

| | Distance[m] | 1 | 2 | 4 | 6 | 8 | 10 | 15 | 20 |
|---|---|---|---|---|---|---|---|---|---|
| Indoor | SnrMainPath | 44 | 43 | 39 | 38 | 34 | 34 | 31 | 27 |
| | SnrFirstPath | 44 | 43 | 39 | 38 | 34 | 34 | 31 | 27 |
| | SnrTotal | 43.344 | 42.805 | 40.156 | 38.945 | 35.773 | 35.16 | 35.547 | 29.691 |
| | Rssi | -68.148 | -68.867 | -77.898 | -78.391 | -82.426 | -83.309 | -87.906 | -88.258 |
| Outdoor | SnrMainPath | 44 | 43 | 40 | 38 | 31 | 27 | 27 | 26 |
| | SnrFirstPath | 44 | 43 | 40 | 38 | 31 | 27 | 27 | 26 |
| | SnrTotal | 43.285 | 42.355 | 39.535 | 38.887 | 32.797 | 28.387 | 28.445 | 26.906 |
| | Rssi | -64.586 | -72.031 | -77.887 | -79.887 | -85.883 | -88.715 | -89.718 | -93.691 |

[810]

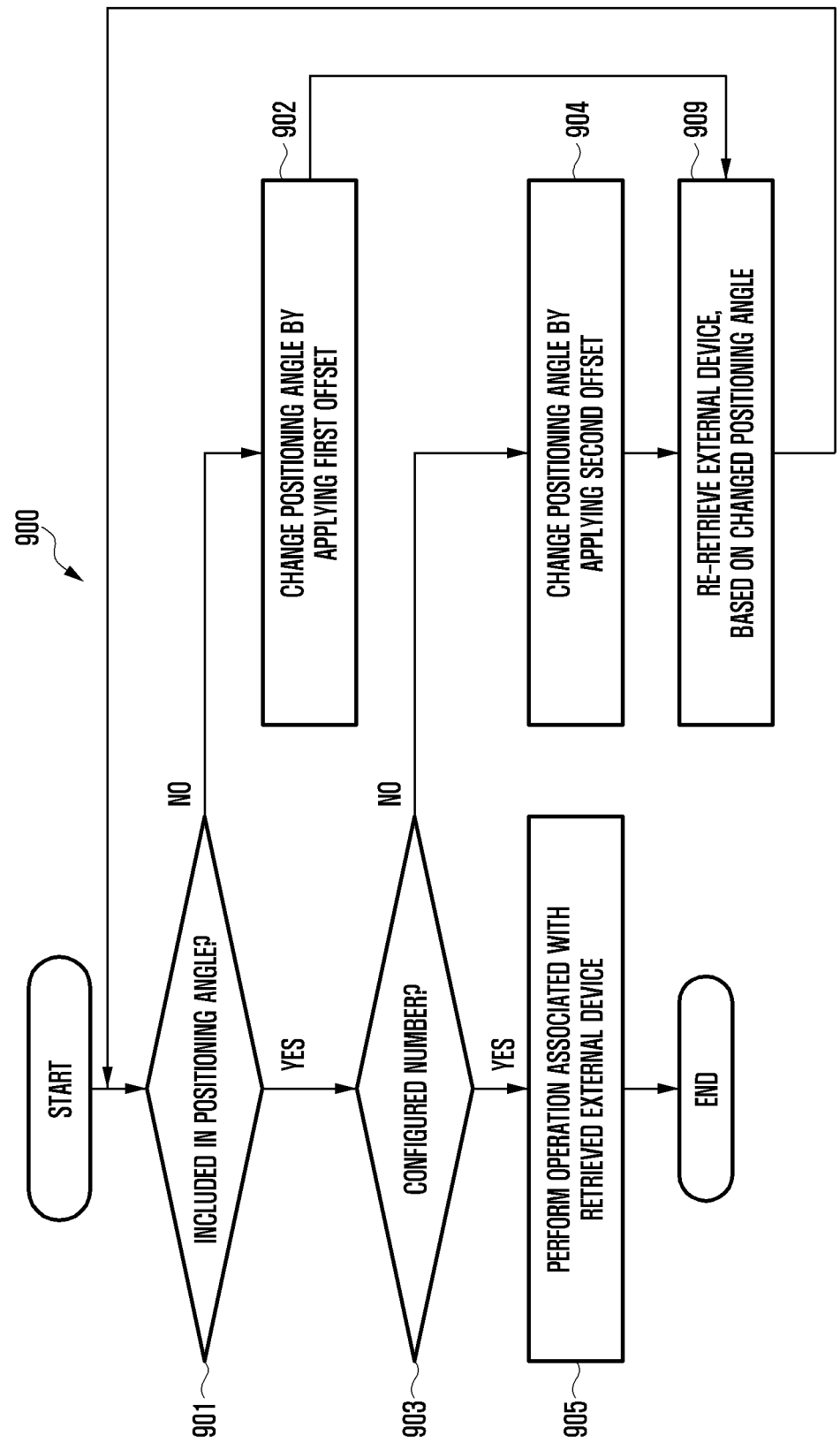

FIG. 11

| DISTANCE | FIRST POSITIONING ANGLE | SECOND POSITIONING ANGLE |
|---|---|---|
| DISTANCE < 1m | -15° ~ +15° | -18° ~ +18° |
| 1m < DISTANCE < 3m | -15° ~ +15° | -20° ~ +20° |
| 3m < DISTANCE | -15° ~ +15° | -23° ~ +23° |

(1110)

| RSSI (or SNR) | FIRST POSITIONING ANGLE | SECOND POSITIONING ANGLE |
|---|---|---|
| RSSI > -75 | -15° ~ +15° | -18° ~ +18° |
| -75 > RSSI > -85 | -15° ~ +15° | -20° ~ +20° |
| -85 > RSSI > -90 | -15° ~ +15° | -23° ~ +23° |

(1130)

FIG. 15A
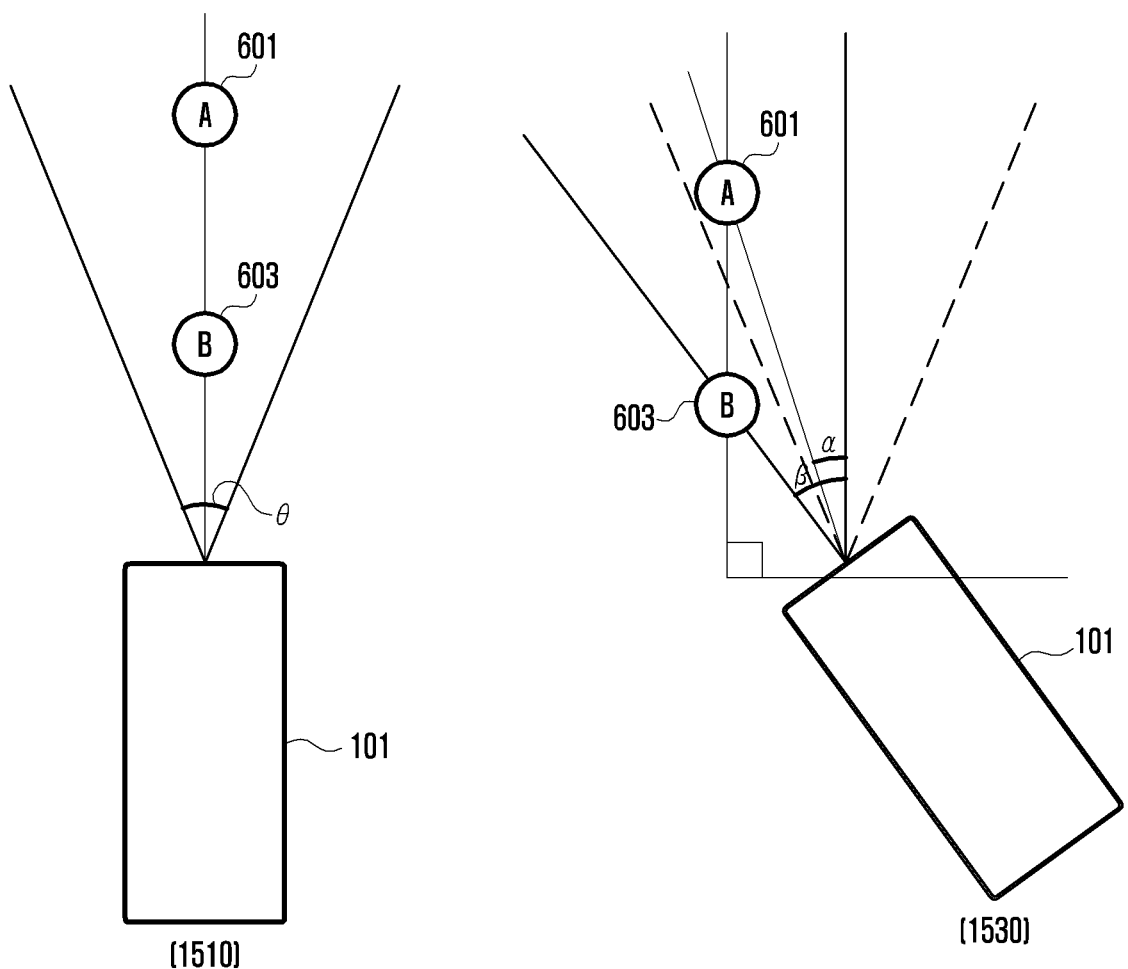
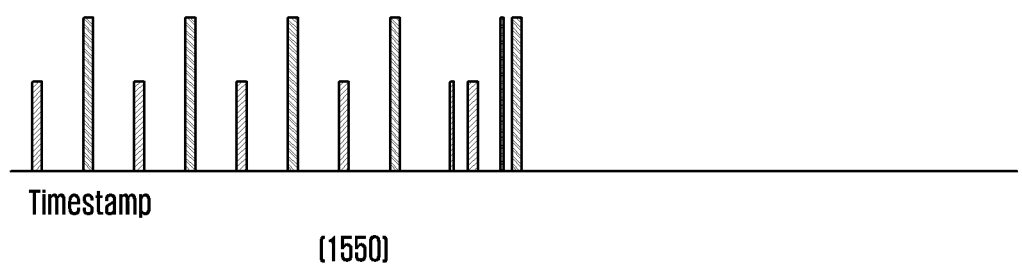

FIG. 15B
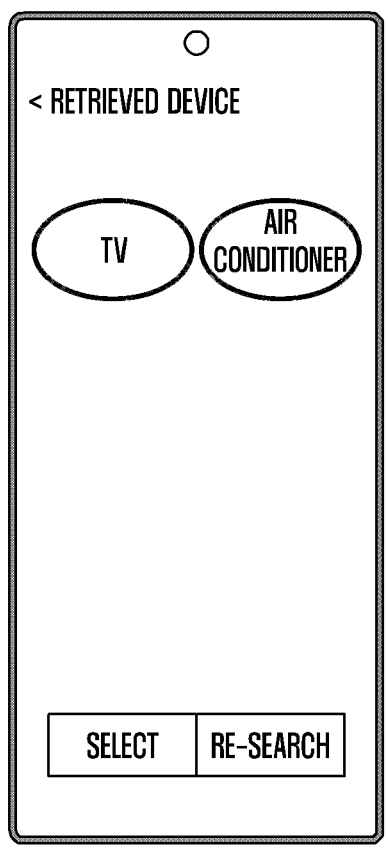
(1510)
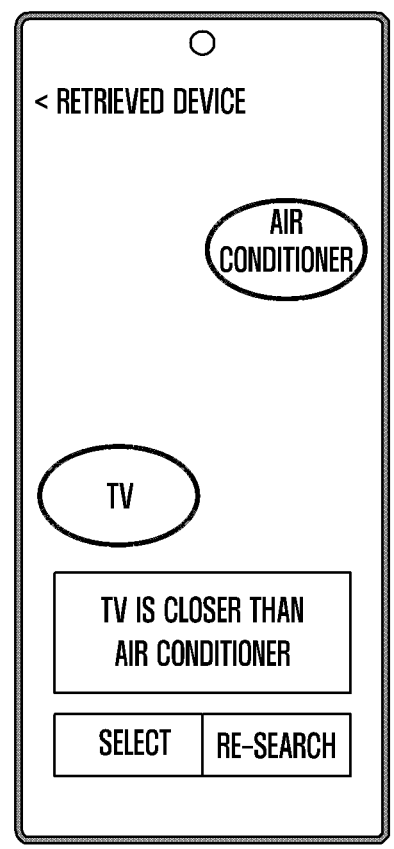
(1550)

METHOD AND ELECTRONIC DEVICE FOR RETRIEVING EXTERNAL DEVICE THROUGH POSITIONING ANGLE ADJUSTMENT

CROSS-REFERENCE TO RELATED APPLICATIONS

This application is a bypass continuation of PCT International Application No. PCT/KR2022/011872, which was filed on Aug. 9, 2022, and claims priority to Korean Patent Application No. 10-2021-0132258, filed on Oct. 6, 2021, and Korean Patent Application No. 10-2022-0004694, filed on Jan. 12, 2022, in the Korean Intellectual Property Office, the disclosure of which is incorporated herein by reference in its entirety.

BACKGROUND

1. Field

Various embodiments of the disclosure relate to a method and a device for efficiently retrieving an external device through positioning angle adjustment.

2. Description of Related Art

With the advancement of digital technology, various types of electronic devices, such as a mobile communication terminal, a personal digital assistant (PDA), an electronic organizer, a smartphone, a tablet, a personal computer (PC), or a wearable device, are widely used. In order to support and improve the functions of electronic devices, hardware and/or software of electronic devices are continuously being developed.

For example, an electronic device may retrieve an external device (or a target device or a peripheral device) located near the electronic device through communication, such as Bluetooth, wireless fidelity (Wi-Fi), or ultra-wideband (UWB). For example, the external device may be an Internet of Things (IoT) device, such as a refrigerator, a washing machine, a TV, a set-top box, a printer, or a scanner. The electronic device may select at least one external device from among retrieved external devices to transmit a file or message to the external device. The electronic device may select an external device to transmit data (e.g., a file or a message), based on a distance (or location) or angle to the external device. For example, the electronic device may measure the distance or angle to the external device through UWB communication.

SUMMARY

Conventionally, an electronic device may select an external device positioned at a specific angle (e.g., 0°) or may select an external device included in a fixed angle range or a fixed distance range. When a range for selecting an external device is fixed, a user may have difficulty in selecting a desired external device. Since the user does not know the location of a UWB antenna included in the electronic device or the external device, even though the user points to a location where the first external device 601 actually exists, a UWB signal may be output from a different location of the external device, and thus the desired external device may not be selected.

Various embodiments may disclose a method and a device for retrieving an external device through UWB communication, determining whether the retrieved external device corresponds to a configured condition, and variably controlling a positioning angle, based on a determination result.

An electronic device according to various embodiments of the disclosure may include a display, a communication module, a memory, and a processor configured to be operatively connected to at least one of the display, the communication module, or the memory. The processor may be configured to perform ultra-wideband (UWB) communication through the communication module. The processor may be configured to retrieve at least one external device corresponding to a perceivable range of the UWB communication, based on the UWB communication, determine whether a configured condition including at least one of whether the retrieved external device is within a positioning angle smaller than the perceivable range, whether a number of retrieved external devices corresponds to a configured number, or whether a distance between the electronic device and the retrieved external device is a configured distance is satisfied, perform an operation related to the retrieved external device when the retrieved external device corresponds to the configured condition, and re-retrieve the at least one external device by changing the positioning angle when the retrieved external device does not correspond to the configured condition.

An operating method of an electronic device according to various embodiments of the disclosure may include performing ultra-wideband (UWB) communication through a communication module of the electronic device. The method may include retrieving at least one external device corresponding to a perceivable range of the UWB communication, based at least in part on the UWB communication, determining whether a configured condition including at least one of whether the retrieved external device is within a positioning angle smaller than the perceivable range, whether a number of retrieved external devices corresponds to a configured number, or whether a distance between the electronic device and the retrieved external device is a configured distance. The method may include performing an operation related to the retrieved external device when the retrieved external device satisfies the configured condition, and re-retrieving an external device by changing the positioning angle when the retrieved external device does not correspond to the configured condition.

According to various embodiments, whether an external device retrieved through UWB communication corresponds to a configured condition may be determined, and a positioning angle may be variably controlled based on a determination result, thereby controlling selection of an external device desired by a user.

According to various embodiments, a positioning angle may be dynamically changed according to a distance to an external device retrieved through UWB communication, thereby increasing accuracy in selecting an external device.

According to various embodiments, when there is no distance information about an external device, a distance to the external device may be inferred based at least in part on the strength (e.g., a received signal strength indication (RSSI) or a signal-to-noise ratio (SNR)) of a UWB signal received from the external device, thereby dynamically changing a positioning angle according to the distance to the external device.

According to various embodiments, when there are at least two external devices having similar angles, a location change of an electronic device may be reported to a user, and information obtained after the location change of the electronic device may be compared with information obtained before the location change, thereby providing more accurate information about a distance or angle of an external device.

According to various embodiments, the external device may be identified in further consideration of context information in addition to the positioning angle or the number or distance of external devices.

BRIEF DESCRIPTION OF DRAWINGS

The above and other aspects, features, and advantages of certain embodiments of the present disclosure will be more apparent from the following description taken in conjunction with the accompanying drawings, in which:

FIG. 6A to FIG. 6D illustrate examples in which an electronic device retrieves an external device according to various embodiments;

FIG. 8A to FIG. 8C illustrate correlations between signal strength and a distance according to various embodiments;

FIG. 9 is a flowchart illustrating a method for selecting or re-retrieving an external device by an electronic device according to various embodiments;

FIG. 11 illustrates an example in which an electronic device changes a positioning angle according to a distance according to various embodiments;

FIG. 15A and FIG. 15B illustrate examples of retrieving an external device by changing the location of an electronic device according to various embodiments.

DETAILED DESCRIPTION

Figure 1:
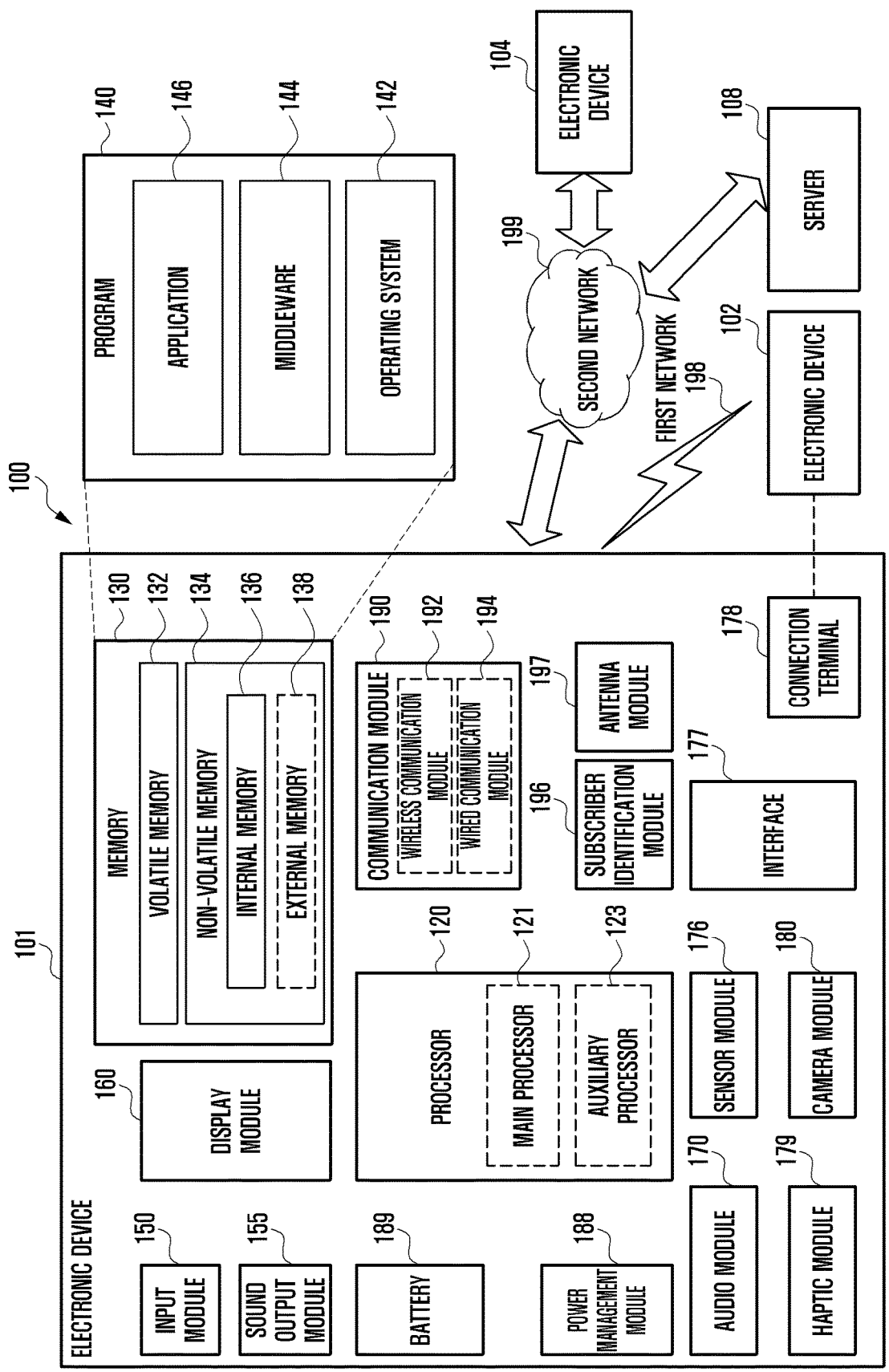
FIG. 1 is a block diagram of an electronic device in a network environment according to various embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
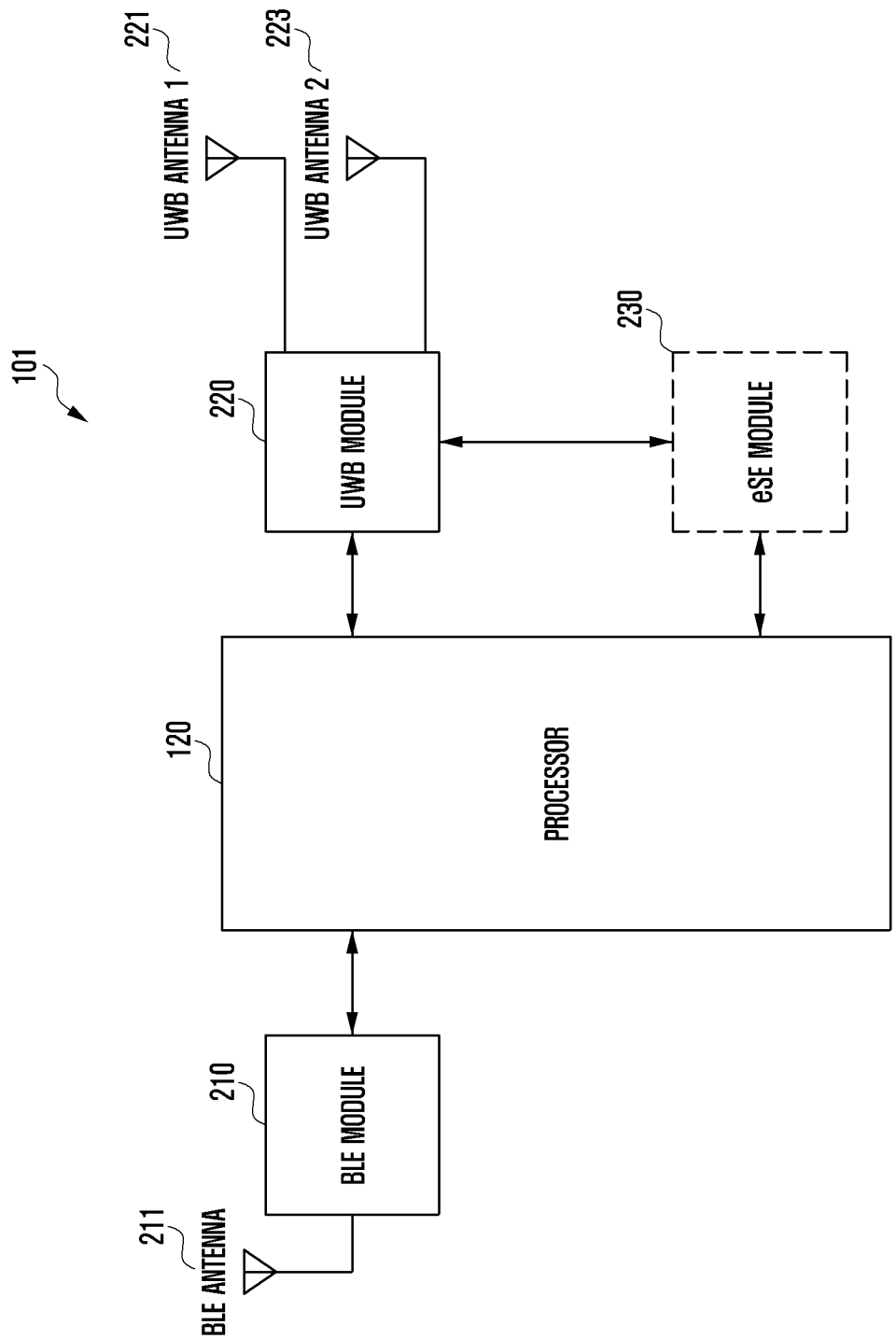
FIG. 2 is a block diagram of hardware of an electronic device according to various embodiments.

FIG. 2 is a block diagram of hardware of an electronic device according to various embodiments.

Referring to FIG. 2, the electronic device (e.g., the electronic device 101 of FIG. 1) according to various embodiments may include a processor 120, a Bluetooth Low Energy (BLE) module 210, a BLE antenna 211, a ultra-wideband (UWB) module 220, UWB antenna 1 221, UWB antenna 2 223, and/or an embedded secure element (eSE) module 230. According to various embodiments, at least one (e.g., UWB antenna 2 213) among the components included in FIG. 2 may be omitted from the electronic device 101, or one or more other components may be added thereto. The BLE module 210, the UWB module 220, and/or the eSE module 230 may be operatively connected to the processor 120. The BLE module 210 or the UWB module 220 may be included in the communication module 190 of FIG. 1. The BLE module 210 may transmit or receive a BLE signal under control of the processor 120. The BLE module 210 may transmit or receive the BLE signal through the BLE antenna 211.

The UWB module 220 may include a transmitter (TX) module to transmit a UWB signal (e.g., poll, response, or final) for positioning from an external electronic device (e.g., the electronic device 102 or the electronic device 104 of FIG. 1) and a receiver (RX) module to receive a UWB signal. The UWB signal may be transmitted or received through UWB antenna 1 221 and/or UWB antenna 2 223. There may be a greater number of UWB antennas than shown in FIG. 2. For example, the UWB signal may be switched to be transmitted and/or received via UWB antenna 1 221 and/or UWB antenna 2 223, based on control of the UWB module 220 and/or the processor 120. The UWB module 220 may operate under control of the processor 120, and may transmit a received UWB signal to the processor 120 or may form a communication path (e.g., a serial peripheral interface) for receiving a control signal from the processor 120.

The eSE module 230 may be a module that generates or stores credential information according to circumstances. The eSE module 230 may transmit the generated credential information to the UWB module 220. The eSE module 230 may be connected to the UWB module 220 through I2C communication. The eSE module 230 may be included in or may be disposed outside the UWB module 220.

Figure 3:
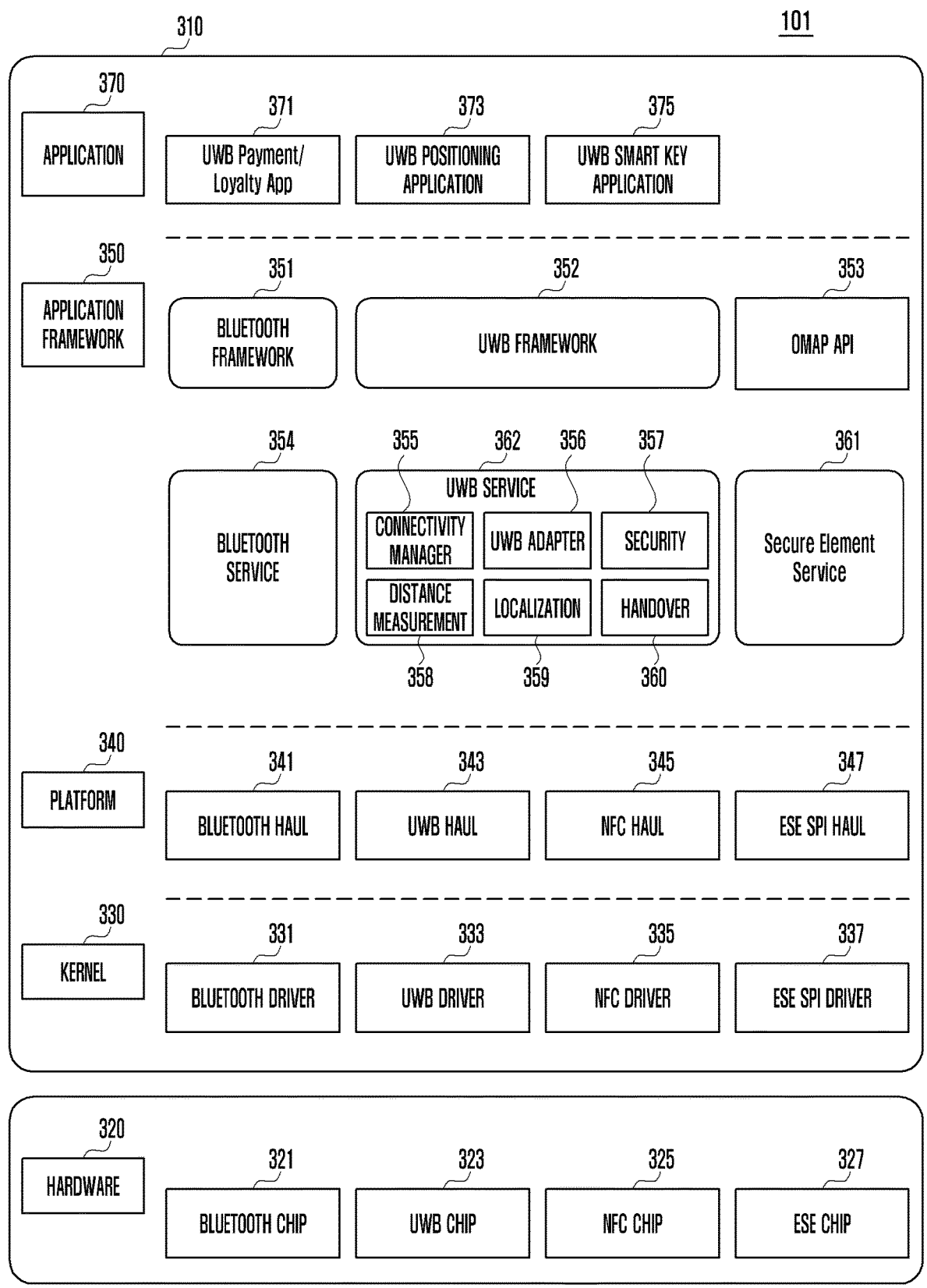
FIG. 3 is a block diagram of a program module of an electronic device supporting a UWB function according to various embodiments.

FIG. 3 is a block diagram of a program module of an electronic device supporting a UWB function according to various embodiments.

Referring to FIG. 3, the electronic device (e.g., the electronic device 101 of FIG. 1) may include an operating system (OS) that controls a resource related to the electronic device 101 and/or a program module 310 including various applications and hardware 320 that run on the operating system. The operating system may be, for example, an operating system including Android, iOS, Windows, Symbian, Tizen, or Bada. FIG. 3 may show the program module 310 and the hardware 320 supporting a UWB function in the electronic device 101 employing an Android operating system.

The program module 310 may include a kernel 330, a platform 340, an application framework 350, or an application 370. At least part of the program module 310 may be preloaded onto the electronic device 101 or may be downloaded from an external electronic device (e.g., the electronic device 102 or 104 or the server 108). The kernel 330 may include a device driver for driving the hardware 320 (e.g., a Bluetooth chip 321, a UWB chip 323, an NFC chip 325, or an eSE chip 327) of the electronic device 101. The NFC chip 325 and the eSE chip 327 may be configured as one. For example, the device driver may include at least one of a Bluetooth driver 331, a UWB driver 333, an NFC driver 335, or an eSE SPI driver 337. The platform 340 may include at least one of a Bluetooth hal 341, a UWB hal 343, an NFC hal 345, or an eSE SPI hal 347 for controlling the device driver of the kernel 330.

The application framework 350 may provide a function commonly required by the application 370 or may provide various functions to the application 370 so that the application 370 may efficiently use limited system resources inside the electronic device 101. For example, the application framework 350 may include a Bluetooth framework 351, a UWB framework 352, an open multimedia applications platform (OMAP) API 353, a Bluetooth service 354, a secure element service 361, and a UWB service 362. The UWB service 362 may include a connectivity manager 355, a UWB adapter 356, security 357, distance measurement 358, localization 359, or handover 360 for supporting a UWB-related API. The electronic device 101 may measure the positions of a plurality of external electronic devices using the UWB adapter 356, the distance measurement 358, or the localization 359.

The application 370 may include a UWB payment/loyalty application 371, a UWB positioning application 373, and a UWB smart key application 375.

Figure 4:
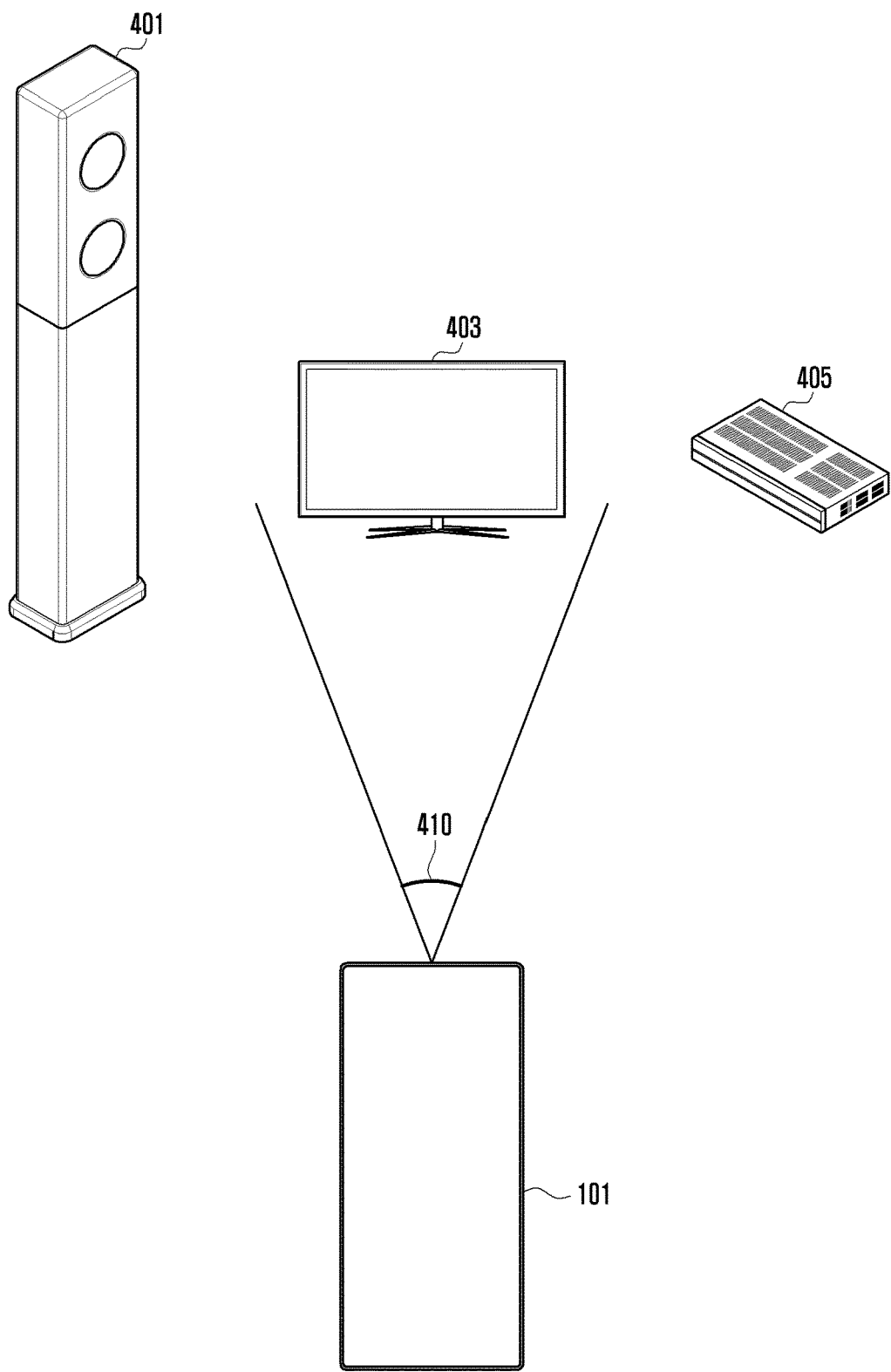
FIG. 4 illustrates an example in which an electronic device retrieves an external device according to various embodiments.

FIG. 4 illustrates an example in which an electronic device retrieves an external device according to various embodiments.

Referring to FIG. 4, the electronic device (e.g., the electronic device 101 of FIG. 1) according to various embodiments may retrieve an external device located nearby through UWB communication according to a user's request. The external device may be referred to as an external electronic device, a target device, or a peripheral device. For example, the external device may be an Internet of Things (IoT) device capable of receiving and controlling wired and wireless signals, such as a refrigerator, a washing machine, a TV, a set-top box, a printer, or a scanner. In another example, the external device may be a device that transmits a wireless signal including data, such as a POS, an electronic board, a menu board, or an advertisement board provided in a store. In still another example, the external device may be a device capable of transmitting a wireless signal including data and changing the data, such as a UWB tag/anchor. According to an embodiment, the external device may store SSID/password information for Wi-Fi connection and may be located near a router to help the connection. The external device may include a first external device 401, a second external device 403, or a third external device 405.

For example, the first external device 401 may be an air conditioner, the second external device 403 may be a TV, and the third external device 405 may be a set-top box. These examples are provided only to assist understanding of the disclosure, and do not limit the disclosure. For UWB communication with the external device, the electronic device 101 may receive a data transmission request from the user. The data transmission request means that the user of the electronic device 101 selects data (e.g., a file, an image, a document, or a control command to change the state of the external device) desired to be transmitted and selects a transmission button. Alternatively, the data transmission request may mean executing an application related to data transmission and selecting data desired to be transmitted.

Alternatively, when executing an application using UWB communication, the electronic device 101 may start communication with the external device using UWB communication. Alternatively, the electronic device 101 may execute an application using UWB communication, may identify a UWB communication method of the external device through in-band communication, and may start communication with the external device based at least in part on the UWB communication method. Alternatively, the electronic device 101 may transmit a UWB communication start request to the external device or may receive a UWB communication start request from the external device through external communication (Bluetooth). Alternatively, the electronic device 101 may start UWB communication when the external device is located within a specified range while a UWB module is being activated.

According to various embodiments, the electronic device 101 may broadcast a message including UWB configuration information through a BLE module (e.g., the BLE module 210 of FIG. 2) in order to connect UWB communication. The UWB configuration information may include whether the electronic device 101 supports UWB communication (e.g., UWB communication support information configured to 1 or 0) or a UWB communication type (or method). For example, when the electronic device 101 supports UWB communication, the electronic device 101 may configure the UWB communication support information to 1, and when the electronic device 101 does not support UWB communication, the electronic device 101 may configure the UWB communication support information to 0. Since the message is broadcast, the message may be transmitted to the first external device 401 to the third external device 405 existing near the electronic device 101. The electronic device 101 may periodically transmit the message (e.g., BLE advertising).

The UWB communication type may include at least one of single-sided TWR (SS-TWR), double-sided TWR (DS-TWR), advertisement, uplink (UL) time difference of arrival (TDoA), or downlink (DL) TDoA. These examples are provided only to assist understanding of the disclosure, and the disclosure is not limited by the description. In addition to the above-listed UWB communication types, the disclosure may further include other UWB communication types (e.g., an existing UWB communication method and a UWB communication method to be newly added). SS-TWR is a method for identifying the distance or angle between the electronic device 101 and the external device (or the location of the external device) by the electronic device 101 transmitting a ranging poll message (or ranging poll data) to the external device and the external device transmitting a ranging response message to the electronic device 101. DS-TWR is a method, when for identifying the distance or angle between the electronic device 101 and the external device by the electronic device 101 transmitting a ranging poll message, the external device transmitting a ranging response message to the electronic device 101, and the electronic device 101 transmitting a ranging final message to the external device.

The electronic device 101 may receive a response to the message from at least one of the first external device 401 to the third external device 405. The response may include whether the first external device 401 to the third external device 405 support UWB communication or a UWB communication type (or method). The electronic device 101 may establish UWB communication with the first external device

401 to the third external device 405, based at least in part on the response received from the first external device 401 to the third external device 405. When the UWB communication is completely established, the electronic device 101 may activate the UWB communication (e.g., activate (or turn on) the RX module of the UWB module 220), thereby performing the UWB communication with the first external device 401 to the third external device 405. When the UWB communication type is SS-TWR or DS-TWR, the electronic device 101 may establish UWB communication using BLE or Wi-Fi before activating the RX module of the UWB module 220.

When the UWB communication type is advertisement, UL TDoA, or DL TDoA, the electronic device 101 may start UWB communication using a predefined (or pre-agreed) configuration. Advertisement is a method in which the external device transmits a UWB signal (e.g., an advertisement) but the external device may not receive a UWB signal from the electronic device 101. In the advertisement, the electronic device 101 may measure only the angle with the external device, but may not measure the distance to the external device.

TDoA may measure the distance or angle to the external device using a difference in propagation time of a signal of a location tag (e.g., a transmitter) measured by a location anchor (e.g., a receiver). The external device corresponding to the location tag may transmit a broadcast message (e.g., an advertisement) to the electronic device 101 corresponding to the location anchor, and the electronic device 101 may generate a time of arrival (ToA) stamp for the received message and may calculate a TDoA from the ToA. The electronic device 101 may report the ToA stamp to a location server (e.g., the server 108 of FIG. 1) through wired or wireless communication, and the server 108 may calculate a TDoA from the ToA. UL TDoA may refer to calculating the distance or angle to the external device by the server 108, and DL TDoA may refer to calculating the distance or angle to an external device by the electronic device 101. The electronic device 101 may directly receive a broadcast message transmitted by the location tag without going through the server, thus obtaining a relative angle with the location tag.

For example, the first external device 401 is capable of performing UWB communication through SS-TWR, and the second external device 401 and the third external device 405 are capable of performing UWB communication through advertisement. For example, the electronic device 101 may be configured to perform UWB communication with the first external device 401 through SS-TWR and may be configured to perform UWB communication with the second external device 401 and the third external device 405 through advertisement. These examples are provided only to assist understanding of the disclosure, and do not limit the disclosure.

The electronic device 101 may retrieve an external device included in a UWB communication-perceivable range (e.g., a field of view (FoV)), based at least in part on a UWB signal received from the first external device 401 to the third external device 405, e.g., retrieve one or more external devices corresponding to a field of view of the UWB communication, based at least in part on the UWB communication. The UWB signal may correspond to a poll, a response, a final, or an advertisement. The UWB signal may include at least one of time information, a timestamp, angle information (e.g., an azimuth and an elevation), a received signal strength indication (RSSI), signal-to-noise ratio (SNR) information (e.g., a first SNR, a main SNR, and a total SNR), or a transmit power (e.g., TX power). The time information may include at least one of a UWB signal transmission time, a UWB signal reception time, or a UWB signal processing time.

When the UWB communication type is at least one of SS-TWR, DD-TWR, UL TDoA, or DL TDOA, the electronic device 101 may measure the distance to the external device, based at least in part on the time information included in the UWB signal. The electronic device 101 may transmit or receive the UWB signal 360 degrees. Since the user intends to transmit data to the external device located in front, the electronic device 101 may retrieve an external device included in the UWB communication-perceivable range (e.g., −60° to +60°) corresponding to the front of the electronic device 101.

According to various embodiments, the electronic device 101 may retrieve the external device included in the UWB communication-perceivable range for a configured time or a configured number of times. When a UWB signal transmitted from an external device not located in front of the electronic device 101 is reflected by an obstacle (e.g., a wall or an object) and received by the electronic device 101, the electronic device 101 may determine that the UWB signal is transmitted from the front. For example, the first external device 401 may exist behind the electronic device 101, and the second external device 403 and the third external device 405 may exist in front of the electronic device 101. When a UWB signal transmitted from the first external device 401 is reflected by a wall and received by the electronic device 101, the electronic device 101 may determine that the first external device 401 exists in front of the electronic device 101. To mitigate the effect of reflected signals, the electronic device 101 may determine that the external device included in the UWB communication-perceivable range for the configured time or the configured number of times is located in front of the electronic device 101.

The electronic device 101 may trigger UWB communication using other communication (e.g., Bluetooth communication, BLE communication, or Wi-Fi communication) than UWB communication. The electronic device 101 may determine whether the retrieved external device corresponds to a configured condition, e.g., determine whether the configured condition is satisfied by a retrieved external device of the retrieved one or more external devices. The electronic device 101 may retrieve the external device through various communications, such as UWB communication or BLE communication, and when the distance measured by UWB communication is not correct, the electronic device 101 may measure the distance to the external device through a different communication. The configured condition may relate to whether at least one of a positioning angle 410 (e.g., whether the retrieved external device is within a positioning angle smaller than the field of view), the number of external devices (e.g., whether a number of the retrieved one or more external devices corresponds to a configured number), or a distance to an external device (e.g., whether a distance between the electronic device and the retrieved external device is a configured distance) is satisfied. The positioning angle 410 may be different from the UWB communication-perceivable range. For example, the positioning angle 410 (e.g., −10° to +10°) may be smaller than the UWB communication-perceivable range, and may be configured in the electronic device 101 to efficiently retrieve (or identify) an external device desired by the user. The positioning angle 410 may be configured based at least in part on a table generated with a distance value, an RSSI, and an SNR, and may include an azimuth and an elevation. Although the positioning angle 410 is conventionally fixed, the positioning angle 410 may be changed (or adjusted) in the disclosure.

The electronic device 101 may retrieve the external device in further consideration of context information in addition to the number or distance of retrieved external devices. The context information may be identifying an external device (e.g., a speaker) required for an actual service (e.g., music playback). The electronic device 101 may adjust an angle range in consideration of the context information.

When the retrieved external device does not satisfy the configured condition, the electronic device 101 may change at least one of the azimuth or the elevation of the positioning angle, e.g., adjust the positioning angle when the retrieved one or more external devices do not satisfy the configured condition, in order to re-retrieve the one or more external devices. Changing (or adjusting) the positioning angle 410 may be for filtering external devices until only a predetermined number of external devices is retrieved when a plurality of external devices is retrieved, or for re-retrieving an external device.

For example, to transmit data to an external device, at least one external device needs to be retrieved, and thus the electronic device 101 may determine that the configured condition is satisfied when a configured number (e.g., one or two) of external devices included in the positioning angle 410 are retrieved. The configured number may be configured by the user or may be configured by default in the electronic device 101. Alternatively, when the number (e.g., three or more) of external devices included in the positioning angle 410 exceeds the configured number (e.g., one or two), the electronic device 101 may determine that the configured condition is not satisfied. When any external device included in the positioning angle 410 is not retrieved (e.g., when the number of external devices is less than the configured number), the electronic device 101 may determine that the configured condition is not satisfied.

According to various embodiments, the configured number used to reduce or increase the positioning angle may vary. For example, the electronic device 101 may increase the positioning angle when the number of external devices included in the positioning angle 410 is 0, and may increase the positioning angle even when the number of external devices included in the positioning angle 410 is one or two.

Alternatively, when an external device included in the UWB communication-perceivable range and not included in the positioning angle 410 is retrieved and the distance to the retrieved external device is a configured distance (e.g., within 1 m), the electronic device 101 may determine that the configured condition is not satisfied. Alternatively, when an external device (e.g., the second external device 403) included in the positioning angle 410 is retrieved and the distance to an external device (e.g., the first external device 401 or the third external device 405) not included in the positioning angle 410 is the configured distance, the electronic device 101 may determine that the configured condition is not satisfied. Alternatively, when the distance to an external device within the positioning angle 410 is greater than the distance to an external device outside the positioning angle 410, the electronic device 101 may determine that the configured condition is not satisfied.

According to various embodiments, the electronic device 101 may obtain (or measure) the distance to an external device to determine whether the configured condition is satisfied. Measuring the distance or angle to an external device by different method according to the foregoing UWB communication types pertains to the prior art, and thus a detailed description thereof may be omitted. Among the foregoing UWB communication types, SS-TWR, DS-TWR, UL TDoA, or DL TDoA may be capable of measuring the distance or angle to an external device. Advertisement may measure the angle with an external device, but may not be capable of distance measurement. When an external device performs UWB communication supporting distance information (e.g., at least one of SS-TWR, DS-TWR, UL TDoA, or DL TDoA), the electronic device 101 may measure information about the distance to the external device, based at least in part on time information included in a UWB signal, and may measure (or obtain) information about the angle (e.g., angle of arrival (AoA)) to the external device from angle information (e.g., an azimuth and/or an elevation) included in the UWB signal.

When an external device performs UWB communication not supporting distance information (e.g., the advertisement method), the electronic device 101 may estimate (or calculate) the distance to the external device, based at least in part on signal strength (e.g., RSSI or SNR information) included in a UWB signal. The electronic device 101 may estimate (or calculate) the distance to the external device, based at least in part on a Friis formula (e.g., Friis's path loss formula).

$$PR=PT+G-L-20 \log 10(4\pi fcd/c) \quad \text{Friis formula}$$

PR (dBm) may denote the signal strength (e.g. RSSI or SNR) of the received UWB signal, PT (dBm) may denote transmitted power, G (dB) may denote the gain of a UWB antenna (e.g., UWB antenna 1 221 or UWB antenna 2 223 of FIG. 2), L (dB) may denote a path loss, c may denote the speed of light ($2.99792458 \times 10^8$ m/s), fc may denote the center frequency of a channel, and d may denote the distance between the electronic device 101 and the external device.

The electronic device 101 may also estimate the distance to the external device, based at least in part on the signal strength included in the UWB signal, through an equation other than the Friis formula.

When the retrieved external device satisfies the configured condition, the electronic device 101 may display the retrieved external device on a display (e.g., the display module 160 of FIG. 1) (e.g., perform an operation related to the retrieved external device when the retrieved external device satisfies the configured condition). The electronic device 101 may display a user interface including information (e.g., a name (e.g., product name), a serial number, and a distance) about the external device on the display module 160. The user may select the displayed external device and may transmit data to the selected external device. For data transmission, Bluetooth or Wi-Fi may be used.

When the retrieved external device does not satisfy the configured condition, the electronic device 101 may change the positioning angle 410. For example, when there is no external device included in the positioning angle 410, or when an external device not included in the positioning angle is retrieved and the distance to the retrieved external satisfies the configured distance, the electronic device 101 may increase or reduce the positioning angle 410 by stages. For example, the electronic device 101 may increase the positioning angle 410 by applying a first offset to the positioning angle 410. Alternatively, when the number of external devices included in the positioning angle 410 exceeds the configured number, the electronic device 101 may reduce the positioning angle 410 by applying a second offset to the positioning angle 410.

Alternatively, the electronic device 101 may adjust (e.g., increase or reduce) the positioning angle 410, based at least in part on the distance to an external device. For example, when an external device included in the positioning angle 410 is retrieved and the distance to an external device not included in the positioning angle 410 corresponds to the configured distance, the electronic device 101 may adjust the positioning angle 410, based at least in part on the distance to the external device. Alternatively, the electronic device 101 may change the positioning angle 410 differently for each external device. For example, when the distance to an external device within the positioning angle 410 is greater than the distance to an external device outside the positioning angle 410, the electronic device 101 may adjust the positioning angle.

According to various embodiments, when pieces of angle information (e.g., azimuths and/or elevations) about at least two external devices are similar within a configured reference value, the electronic device 101 may request a change of the location of the electronic device 101. The electronic device 101 may provide a user interface for requesting a change of the location (or angle) of the electronic device 101. The electronic device 101 may request the change of the location of the electronic device 101 using at least one of text, an image, a video, or a voice. When the user changes the location of the electronic device 101 according to a location change request, the electronic device 101 may receive a UWB signal from an external device and may determine whether the configured condition is satisfied, based at least in part on the received UWB signal. The electronic device 101 may provide a user interface for selecting the external device, may adjust the positioning angle 410, or may request a change of the location of the electronic device 101 according to the determination result.

An electronic device (e.g., the electronic device 101 of FIG. 1) according to various embodiments of the disclosure may include a display (e.g., the display module 160 of FIG. 1), a communication module (e.g., the communication module 190 of FIG. 1), a memory (e.g., the memory 130 of FIG. 1), and a processor (e.g., the processor 120 of FIG. 1) operatively connected to at least one of the display, the communication module, or the memory, wherein the processor may be configured to perform ultra-wideband (UWB) communication through the communication module, retrieve at least one external device corresponding to a perceivable range of the UWB communication, based at least in part on the UWB communication, determine whether a configured condition including at least one of whether the retrieved external device is within a positioning angle smaller than the perceivable range, whether a number of retrieved external devices corresponds to a configured number, or whether a distance between the electronic device and the retrieved external device is a configured distance is satisfied, perform an operation related to the retrieved external device when the retrieved external device corresponds to the configured condition, and re-retrieve an external device by changing the positioning angle when the retrieved external device does not correspond to the configured condition.

According to an embodiment, the positioning angle may be configured based at least in part on a table generated with a distance value, an RSSI, and an SNR, and may include an azimuth and an elevation, and the processor may be configured to change at least one of the azimuth or the elevation of the positioning angle when the retrieved external device does not correspond to the configured condition.

According to an embodiment, the processor may be configured to increase the positioning angle when the number of retrieved external devices does not correspond to the configured number, and reduce the positioning angle when the number of retrieved external devices exceeds the configured number, and the configured number used to increase or reduce the positioning angle may be configured to be the same or different.

According to an embodiment, the processor may be configured to determine that the retrieved external device satisfies the configured condition when the retrieved external device is within the positioning angle and the number of retrieved external devices within the positioning angle corresponds to the configured number.

According to an embodiment, the processor may be processor is configured to determine that the retrieved external device does not satisfy the configured condition when the retrieved external device is not within the positioning angle and the distance between the electronic device and the retrieved external device corresponds to the configured distance.

According to an embodiment, the processor may be configured to determine that the configured condition is not satisfied when a distance of a first external device within the positioning angle is longer than a distance of a second external device outside the positioning angle.

According to an embodiment, the processor may be configured to obtain information about the distance to the retrieved external device by a different method depending on a type of the UWB communication.

According to an embodiment, the processor may be configured to perform the UWB communication when receiving a data transmission request from a user.

According to an embodiment, the processor may be configured to adjust the positioning angle in further consideration of context information about the electronic device, and select one of the at least one retrieved external device within the positioning angle, and the context information may be generated based at least in part on an application executed in the electronic device.

According to an embodiment, the processor may be configured to adjust the positioning angle, based at least in part on a distance to a second external device when a first external device within the positioning angle is identified and the distance to the second external device not within the positioning angle corresponds to the configured distance.

According to an embodiment, the processor may be configured to change the positioning angle differently corresponding to a first external device and a second external device when a distance of the first external device within the positioning angle is longer than a distance of the second external device outside the positioning angle.

According to an embodiment, the processor may be configured to request a change of a location of the electronic device when two or more external devices are retrieved, pieces of angle information between the electronic device and the two or more retrieved external devices are similar within a configured reference value, receive a UWB signal from the two or more retrieved external devices as detecting the change of the location of the electronic device, and determine whether the configured condition is satisfied, based at least in part on the received UWB signal.

According to an embodiment, the processor may be configured to increase the positioning angle by applying a first offset to the positioning angle when the retrieved external device is not within the positioning angle, reduce the positioning angle by applying a second offset to the positioning angle when the number of retrieved external devices within the positioning angle exceeds the configured number, and identify whether the configured condition is satisfied by repeating an operation of applying the first offset or the second offset to the positioning angle a specified number of times.

Figure 5:
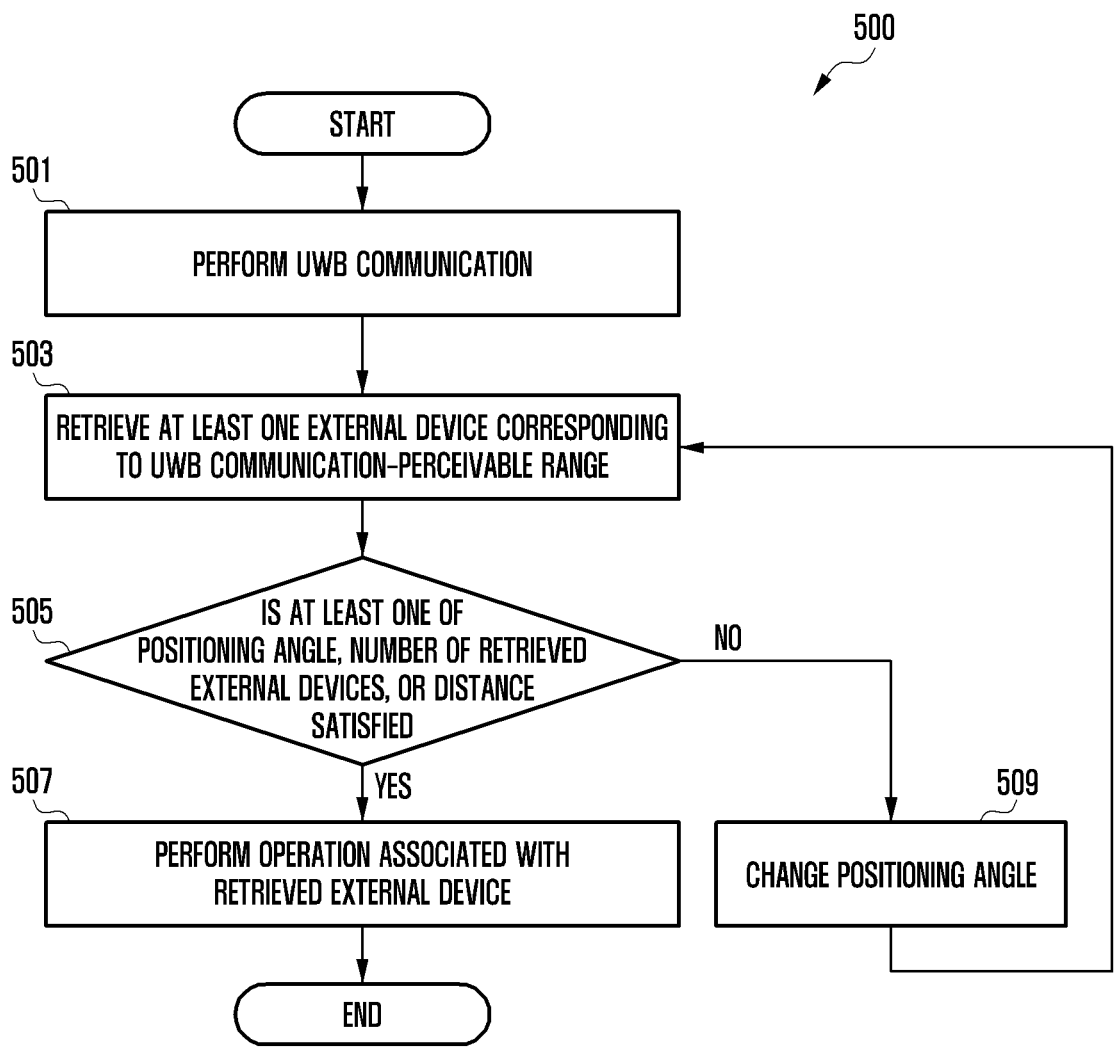
FIG. 5 is a flowchart illustrating an operating method of an electronic device according to various embodiments.

FIG. 5 is a flowchart 500 illustrating an operating method of an electronic device according to various embodiments.

Referring to FIG. 5, the electronic device (e.g., the electronic device 101 of FIG. 1) according to various embodiments may retrieve an external device through UWB communication, may determine whether the retrieved external device satisfies a configured condition (whether the external device is retrieved within a positioning angle, the number of retrieved external devices, a distance to the external device, and/or context information), and may perform an operation related to the retrieved external device when the configured condition is satisfied, or may change (e.g., increase or reduce) the positioning angle when the configured condition is not satisfied.

In operation 501, a processor (e.g., the processor 120 of FIG. 1) of the electronic device 101 may perform UWB communication through a communication module (e.g., the communication module 190 of FIG. 1 or the UWB module 220 of FIG. 2). The processor 120 may use communication other than UWB communication to establish UWB communication with an external device. For example, the processor 120 may broadcast a message including UWB configuration information through a BLE module (e.g., the BLE module 210 of FIG. 2). Alternatively, the processor 120 may perform UWB communication by exchanging information necessary to establish UWB communication through an operation, such as accessing an access point (AP) at a specific location. Since the message is broadcast, the message may be transmitted to an external device (e.g., the first external device 401 to the third external device 405 of FIG. 4) existing near the electronic device 101. The UWB configuration information may include whether the electronic device 101 supports UWB communication or a UWB communication type. For example, when the electronic device 101 supports UWB communication, the processor 120 may configure the UWB communication support information to 1, and when the electronic device 101 does not support UWB communication, the processor 120 may configure the UWB communication support information to 0. The UWB communication type may include at least one of SS-TWR, DS-TWR, advertisement, UL TDoA, or DL TDoA.

The processor 120 may receive a response to the message from at least one external device. The response may include whether the at least one external device supports UWB communication or a UWB communication type (or method). The processor 120 may establish UWB communication with the at least one external device, based at least in part on the response received from the at least one external device. When the UWB communication is completely established, the processor 120 may activate the UWB communication (e.g., activate (or turn on) the RX module of the UWB module 220), thereby performing the UWB communication with the at least one external device. According to an embodiment, the electronic device 101 may periodically broadcast the message including the UWB configuration information for a predetermined time or a predetermined number of times or more, and may perform the UWB communication with the at least one external device when receiving a response message from the at least one external device.

According to various embodiments, when the UWB communication type is SS-TWR or DS-TWR, the electronic device 101 may establish UWB communication using BLE or Wi-Fi before activating the RX module of the UWB module 220. When the UWB communication type is advertisement, UL TDoA, or DL TDoA, the electronic device 101 may start UWB communication using a predefined (or pre-agreed) configuration.

In operation 503, the processor 120 may retrieve at least one external device corresponding to a UWB communication-perceivable range. The processor 120 may retrieve an external device included in the UWB communication-perceivable range (e.g., a field of view (FoV)), based at least in part on a UWB signal received from the at least one external device. The UWB signal may correspond to a poll, a response, a final, or an advertisement. The UWB signal may include at least one of time information, a timestamp, angle information (e.g., an azimuth and an elevation), an RSSI, SNR information, or a transmit power (e.g., TX power).

For example, when the UWB communication type is SS-TWR, the time information may include at least one of a time when a poll message is received, a time when a response message is transmitted, or a processing time required to receive the poll message and to transmit the response message. The processor 120 may measure the distance to the at least one external device, based at least in part on the time information. The processor 120 may retrieve an external device included in the UWB communication-perceivable range (e.g., −60° to +60°) corresponding to the front of the electronic device 101.

According to various embodiments, the processor 120 may retrieve the external device included in the UWB communication-perceivable range for a configured time or a configured number of times. When a UWB signal transmitted from an external device not located in front of the electronic device 101 is reflected by an obstacle (e.g., a wall or an object) and received by the electronic device 101, the processor 120 may determine that the UWB signal is transmitted from the front. For example, the first external device 401 may exist behind the electronic device 101, and the second external device 403 may exist in front of the electronic device 101. When a UWB signal transmitted from the first external device 401 is reflected by a wall and received by the electronic device 101, the processor 120 may determine that the first external device 401 exists in front of the electronic device 101. To mitigate the effect of reflected signals, the processor 120 may retrieve the external device included in the UWB communication-perceivable range for the configured time or the configured number of times.

In operation 505, the processor 120 may determine whether the retrieved external device satisfies a configured condition including at least one of whether the retrieved external device is included in a positioning angle smaller than the perceivable range, whether the number of retrieved external devices corresponds to a configured number, or whether the distance between the electronic device 101 and the retrieved external device is a configured distance. The configured condition may relate to whether at least one of the positioning angle, the number of external devices, or the distance to an external device is satisfied. The positioning angle may be different from the UWB communication-perceivable range, and may be, for example, smaller than the UWB communication-perceivable range.

The positioning angle may be configured based at least in part on a table generated with a distance value, an RSSI, and an SNR, and may include an azimuth (e.g., a horizontal angle) and an elevation (e.g., a vertical angle). The positioning angle may be configured such that the azimuth and the elevation have the same range, or the azimuth or the elevation may be separately configured. Although the positioning angle is conventionally fixed, the positioning angle may be changed (or adjusted) in the disclosure. When the positioning angle is changed, the processor 120 may change at least one of the azimuth or the elevation of the positioning angle.

According to an embodiment, when only one of the azimuth or the elevation needs to be identified, the processor 120 may retrieve an external device, based at least in part on the azimuth. However, when two or more external devices dynamically exist at the positioning angle, the processor 120 may identify azimuth distribution and elevation distribution of the two external devices, and may identify a wider distribution. Alternatively, the processor 120 may identify a conical range by identifying the azimuth and the elevation.

When a configured number (e.g., one or two) of external devices included in the positioning angle are retrieved, the processor 120 may determine that the configured condition is satisfied. The configured number may be configured by a user, or may be configured by default in the electronic device 101. The context information may be identifying an external device (e.g., a speaker) required for an actual service (e.g., music playback).

According to various embodiments, when the number of external devices included in the positioning angle exceeds the configured number, the processor 120 may determine that the configure condition is not satisfied. Alternatively, when an external device included in the UWB communication-perceivable range and not included in the positioning angle is retrieved and the distance to the retrieved external device is the configured distance (e.g., within 1 m), the processor 120 may determine that the configured condition is not satisfied. Alternatively, when an external device included in the positioning angle is retrieved and the distance to an external device not included in the positioning angle is the configured distance, the processor 120 may determine that the configured condition is not satisfied. Alternatively, when the distance to an external device within the positioning angle 410 is greater than the distance to an external device outside the positioning angle 410, the processor 120 may determine that the configured condition is not satisfied.

According to various embodiments, the angle information (e.g., the azimuth and/or elevation) may have a significant value when a UWB antenna (e.g., UWB antenna 1 221 or UWB antenna 2 223 of FIG. 2) included in the electronic device 101 faces an external device. The processor 120 may measure the slope of the electronic device 101, based at least in part on sensor data obtained through an acceleration sensor or a gyro sensor (e.g., the sensor module 176 of FIG. 1) included in the electronic device 101, and may use the slope of the electronic device 101 for reference when obtaining the angle information (e.g., the azimuth and/or elevation).

According to various embodiments, the processor 120 may analyze an image obtained through a camera (e.g., the camera module 180 of FIG. 1) included in the electronic device 101, thereby determining whether the external device corresponds to the configured condition. Alternatively, the processor 120 may determine whether the external device corresponds to the configured condition in consideration of the angle of view of the camera module 180 along with the analyzed image. When the external device is included in a preview image obtained from the camera module 180, the processor 120 may determine that the external device corresponds to the configured condition.

The processor 120 may select at least one external device in further consideration of context information of the electronic device 101 in addition to the positioning angle, the number, or the distance. The context information may be generated based at least in part on an application executed in the electronic device. The processor 120 may select an external device corresponding to an application being executed in the electronic device 101. For example, when playing music in the electronic device 101, the processor 120 may select a speaker when a TV, the speaker, and an air conditioner are retrieved as external devices.

When at least one of whether the retrieved external device is included in the positioning angle smaller than the perceivable range, whether the number of retrieved external devices corresponds to the configured number, or whether the distance between the electronic device and the retrieved external device is the configured distance is satisfied, the processor 120 may perform an operation associated with the retrieved external device in operation 507. For example, when one external device is retrieved, the processor 120 may execute a function interworking with the retrieved external device, may display an application screen, or may access a site. For example, when only a TV is selected as the retrieved external device, the processor 120 may drive and display a TV remote control application. Alternatively, when an electronic board is selected and a product/menu is displayed on the electronic board, the processor 120 may execute and display a URL for ordering the product.

Alternatively, the processor 120 may display a user interface including information (e.g., a name (e.g., product name), a serial number, and/or a distance) about the external device on a display (e.g., the display module 160). When there is a plurality of external devices to be displayed, the processor 120 may display only a configured number of external devices by configuring a high priority in order of closeness to the electronic device 101 or closeness to a reference angle (e.g., 0°). Alternatively, the processor 120 may display a relative positional relationship between external devices to be displayed or a distance to the electronic device 101. The user may select the displayed external device and may transmit data to the selected external device. For data transmission, Bluetooth, Wi-Fi, or UWB may be used.

When at least one of whether the retrieved external device is included in the positioning angle smaller than the perceivable range, whether the number of retrieved external devices corresponds to the configured number, or whether the distance between the electronic device and the retrieved external device is the configured distance is not satisfied, the processor 120 may change the positioning angle in operation 509. For example, the processor 120 may increase or reduce the positioning angle by stages. After changing the positioning angle, the processor 120 may return to operation 503 and may re-retrieve an external device included in the changed positioning angle.

When changing the positioning angle, the processor 120 may change at least one of the azimuth or the elevation of the positioning angle. According to an embodiment, when two or more external devices dynamically exist at the positioning angle, the processor 120 may identify azimuth distribution and elevation distribution of the two external devices, and may identify a wider distribution. Alternatively, the processor 120 may identify a conical range by identifying the azimuth and the elevation.

When there is no external device included in the positioning angle (e.g., when an external device not included in the positioning angle is retrieved and the distance to the retrieved external device corresponds to the configured distance), the processor 120 may increase the positioning angle by applying a first offset to the positioning angle.

Alternatively, when the number of external devices included in the positioning angle exceeds the configured number, the processor 120 may reduce the positioning angle by applying a second offset to the positioning angle. The positioning angle to which the first offset is applied may be greater than the positioning angle to which the second offset is applied. The processor 120 may repeat an operation of applying the first offset or the second offset to the positioning angle a specified number of times, thereby identifying whether the configured condition is satisfied.

According to various embodiments, the processor 120 may adjust (e.g., increase or reduce) the positioning angle, based at least in part on the distance to an external device. For example, when an external device included in the positioning angle is retrieved and the distance to an external device not included in the positioning angle corresponds to the configured distance, the processor 120 may adjust the positioning angle 410, based at least in part on the distance to the external device. Alternatively, the processor 120 may change the positioning angle 410 differently for each external device. For example, when the distance to an external device within the positioning angle 410 is greater than the distance to an external device outside the positioning angle 410, the processor 120 may adjust the positioning angle.

According to various embodiments, when pieces of angle information (e.g., azimuths and/or elevations) about at least two external devices are similar within a configured reference value, the processor 120 may request a change of the location of the electronic device 101. The processor 120 may provide a user interface for requesting a change of the location (or angle) of the electronic device 101. The user interface may be configured as at least one of text, an image, a video, or a voice. The processor 120 may display the user interface (e.g., text, image, and/or video) through the display module 160, and may output a sound (e.g., an audio of a video and/or a voice) through a sound output module 155. When the user changes the location of the electronic device 101 according to a location change request, the processor 120 may transmit a UWB signal to the external device, may receive a UWB signal from the external device, and may determine whether the configured condition is satisfied, based at least in part on the received UWB signal. The processor 120 may provide a user interface for selecting the external device, may adjust the positioning angle, or may request a change of the location of the electronic device 101 according to the determination result.

When the direction of the electronic device 101 is changed, a predetermined number of times, a predetermined time, a positioning angle range, an FoV, and the like which are previously identified may deviate from criteria, in which case the processor 120 moves to operation 503 and may receive a UWB signal again.

The processor 120 may identify whether the FoV is satisfied with respect to each retrieved external device, may identify whether each retrieved external device is retrieved five times or more, may calculate a variance in each of the azimuth/elevation of each retrieved external device when each retrieved external device is retrieved five times or more, may update the last identification time of each retrieved external device, and may update each retrieved external device to "pointing being made" when sensor information from the electronic device 101 is received five times or more, the pitch of the electronic device 101 ranges between −115° and −45°, and the variance is less than 5. When the last identification time of an external device exceeds five seconds, the processor 120 may delete the external device from a selection candidate list.

When pointing is being made, the FoV is satisfied, an azimuth and an elevation are 10 degrees or less, and variances in the azimuth and the elevation are less than 5 with respect to retrieved external devices, the processor 120 may add the retrieved external devices to a first selection candidate list. When pointing is being made, the FoV is satisfied, an azimuth and an elevation are 10 degrees±value predetermined for each RSSI signal or less, and variances in the azimuth and the elevation are less than 5 with respect to retrieved external devices, the processor 120 may add the retrieved external devices to a second selection candidate list.

The processor 120 may arrange the sum of the absolute values of azimuth and elevation of external devices in the first selection candidate list and the second selection candidate list in ascending order, and may arrange RSSI values in descending order when the sums are the same. When only one retrieved external device is included in the first selection candidate list, the processor 120 may select the retrieved external device, and when two or more retrieved external devices are included, the processor 120 may select an arranged first external device and an arranged second external device. When there is no retrieved external device in the first selection candidate list, if only one retrieved external device is included in the second selection candidate list, the processor 120 may select the retrieved external device, and if two or more retrieved external devices are included, the processor 120 may select an arranged first external device and an arranged second external device. The processor 120 may identify data transmitted from a selected external device, and may perform an associated operation. For example, the processor 120 may execute a remote control application, or may access a URL.

FIG. 6A to FIG. 6D illustrate examples in which an electronic device retrieves an external device according to various embodiments.

FIG. 6A illustrates an example in which an electronic device retrieves an external device corresponding to a configured condition.

Referring to FIG. 6A, a processor (e.g., the processor 120 of FIG. 1) of the electronic device (e.g., the electronic device 101 of FIG. 1) according to various embodiments may retrieve at least one external device performing UWB communication, and may determine whether the retrieved external device satisfies a configured condition. The external device may be referred to as an external electronic device, a target device, or a peripheral device. For example, the external device may be an Internet of Things (IoT) device, such as a refrigerator, a washing machine, a TV, a set-top box, a printer, or a scanner. The configured condition may relate to whether at least one of a positioning angle, the number of external devices, or a distance to an external device is satisfied.

When the external device is included in the positioning angle θ and the number of external devices included in the positioning angle θ is a configured number (e.g., one or two), the processor 120 may determine that the configured condition is satisfied. Referring to a first reference numeral 610, when a first external device 601 corresponds to the configured condition, the processor 120 may select the first external device 601. Alternatively, when the first external device 601 is included in the positioning angle θ, the processor 120 may provide a user interface 630 for selecting the first external device 601.

Referring to a second reference numeral 620, the processor 120 may retrieve the first external device 601, a second external device 603, and a third external device 605 which are included in a UWB communication-perceivable range (e.g., the front of the electronic device 101). Referring to the second reference numeral 620, the processor 120 may retrieve the second external device 603 included in the positioning angle θ among the retrieved external devices (e.g., the first external device 601 to the third external device 605), and may determine that the configured condition is satisfied when the number of external devices included in the positioning angle θ is the configured number. Referring to the second reference numeral 620, when the second external device 603 corresponds to the configured condition, the processor 120 may select the second external device 603. Alternatively, when the second external device 603 is included in the positioning angle θ, the processor 120 may provide the user interface 630 for selecting the second external device 603.

FIG. 6B illustrates an example in which an electronic device changes a positioning angle when an external device does not correspond to a configured condition.

Referring to FIG. 6B, a processor 120 may retrieve at least one external device performing UWB communication, and may determine whether the retrieved external device satisfies a configured condition. The processor 120 may retrieve a first external device 601 and a second external device 603 included in a UWB communication-perceivable range (e.g., the front of the electronic device 101). The first external device 601 and the second external device 603 may be included in the UWB communication-perceivable range. The first external device 601 may not be included in a positioning angle θ, and the second external device 603 may be included in the positioning angle θ. When the two external devices are included within the UWB communication-perceivable range, since the external devices are at different distances, the processor 120 may perform re-retrieval by applying a narrower angle than a reference to the second external device 603 and applying a wide angle than the reference to the first external device 601.

Since a user does not know the location of a UWB antenna included in the electronic device 101 or the first external device 601, even though pointing to the location where the first external device 601 actually exists, the first external device 601 may not be included in the positioning angle θ. Referring to a third reference numeral 650 and a fourth reference numeral 660, position A of the first external device 601 may be a position at which a UWB signal is output from the first external device 601. Referring to the third reference numeral 650 and the fourth reference numeral 660, position B of the second external device 603 may be a position at which a UWB signal is output from the second external device 603.

When an antenna of the first external device 601 is disposed toward one side, the processor 120 may recognize the first external device 601 being toward one side and may correct the positioning angle. In addition to angle correction, the processor 120 may select an external device using context information, or may compare information of an external device in the UWB communication-perceivable range and information of an external device included in the positioning angle.

Referring to the third reference numeral 650, the processor 120 may select only the first external device 601. Referring to the fourth reference numeral 660, the processor 120 may select both the first external device 601 and the second external device 603, and the user may select one of the first external device 601 and the second external device 603.

Figure 6C:
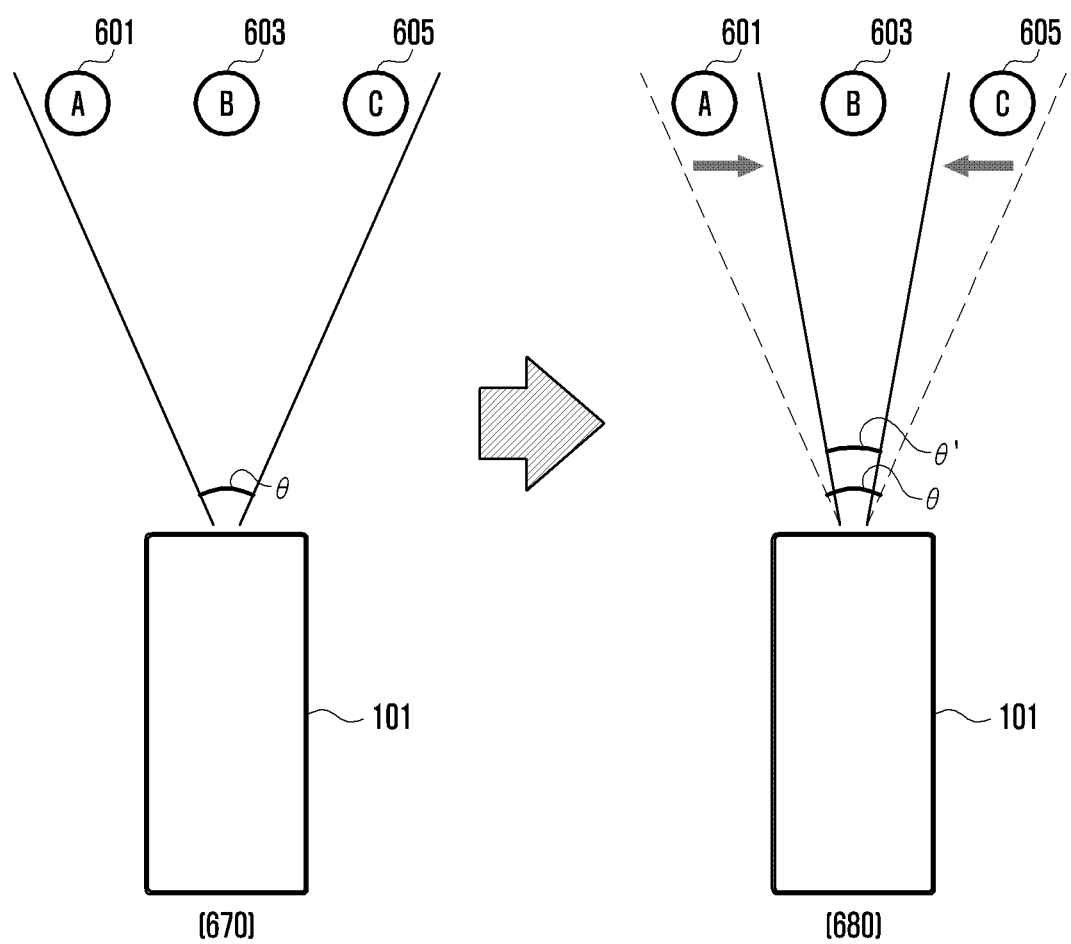

FIG. 6C illustrates an example in which an electronic device controls a positioning angle when an external device does not correspond to a configured condition.

Referring to FIG. 6C, a processor 120 may retrieve at least one external device performing UWB communication, and may determine whether the retrieved external device satisfies a configured condition. Referring to a fifth reference numeral 670, the processor 120 may retrieve a first external device 601, a second external device 603, and a third external device 605 included in a positioning angle θ. Referring to the fifth reference numeral 670, when the number of external devices included in the positioning angle θ does not correspond to a configured number, the processor 120 may determine that the configured condition is not satisfied. When the number of external devices included in the positioning angle θ exceeds the configured number (670), the processor 120 may control (or change) the positioning angle θ. The processor 120 may decrease (or reduce) the positioning angle θ by applying a second offset to the positioning angle θ.

Referring to a sixth reference numeral 680, after changing the positioning angle θ, the processor 120 may retrieve the second external device 603 within the changed positioning angle θ'. When the second external device 603 is included in the changed positioning angle θ' and the number of external devices included in the changed positioning angle θ' is the configured number (e.g., one or two), the processor 120 may determine that the configured condition is satisfied. Referring to the sixth reference numeral 680, when the second external device 603 corresponds to the configured condition, the processor 120 may select the second external device 603.

Figure 6D:
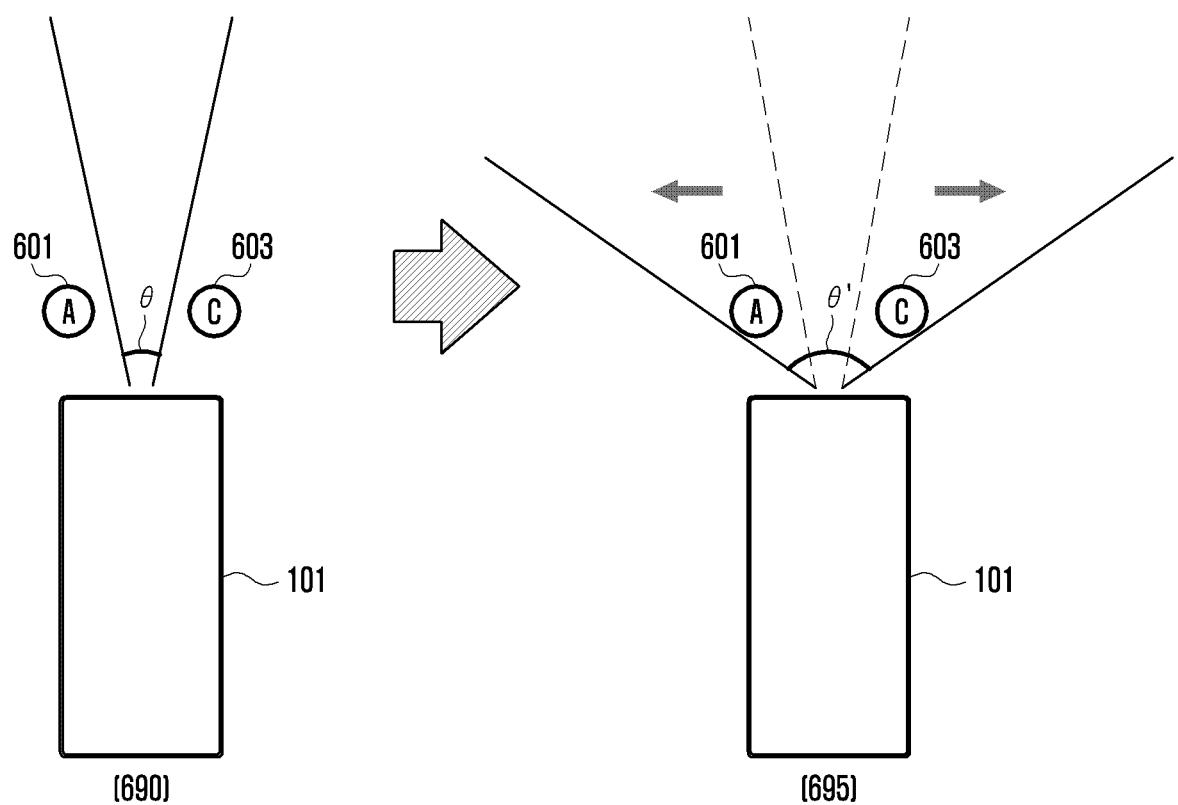

FIG. 6D illustrates an example in which an electronic device changes a positioning angle when an external device does not correspond to a configured condition.

Referring to FIG. 6D, a processor 120 may retrieve at least one external device performing UWB communication, and may determine whether the retrieved external device satisfies a configured condition. Referring to a seventh reference numeral 690, the processor 120 may retrieve a first external device 601 and a second external device 603 included in a UWB communication-perceivable range (e.g., the front of the electronic device 101). The first external device 601 and the second external device 603 may be included in the UWB communication-perceivable range, but may not be included in a positioning angle θ. When an external device is not included in the positioning angle θ, the processor 120 may increase the positioning angle θ.

Referring to an eighth reference numeral 695, after changing the positioning angle θ, the processor 120 may retrieve the first external device 601 and the second external device 603 within the changed positioning angle θ'. Referring to the eighth reference numeral 695, when the first external device 601 and the second external device 603 are included in the changed positioning angle θ' and the number of external devices included in the changed positioning angle θ' is a configured number (e.g., two), the processor 120 may determine that the configured condition is satisfied. Referring to the eighth reference numeral 695, when the first external device 601 and the second external device 603 correspond to the configured condition, the processor 120 may select the first external device 601 and the second external device 603. For example, the processor 120 may provide a user interface (not shown) for selecting the first external device 601 and the second external device 603.

Figure 7:
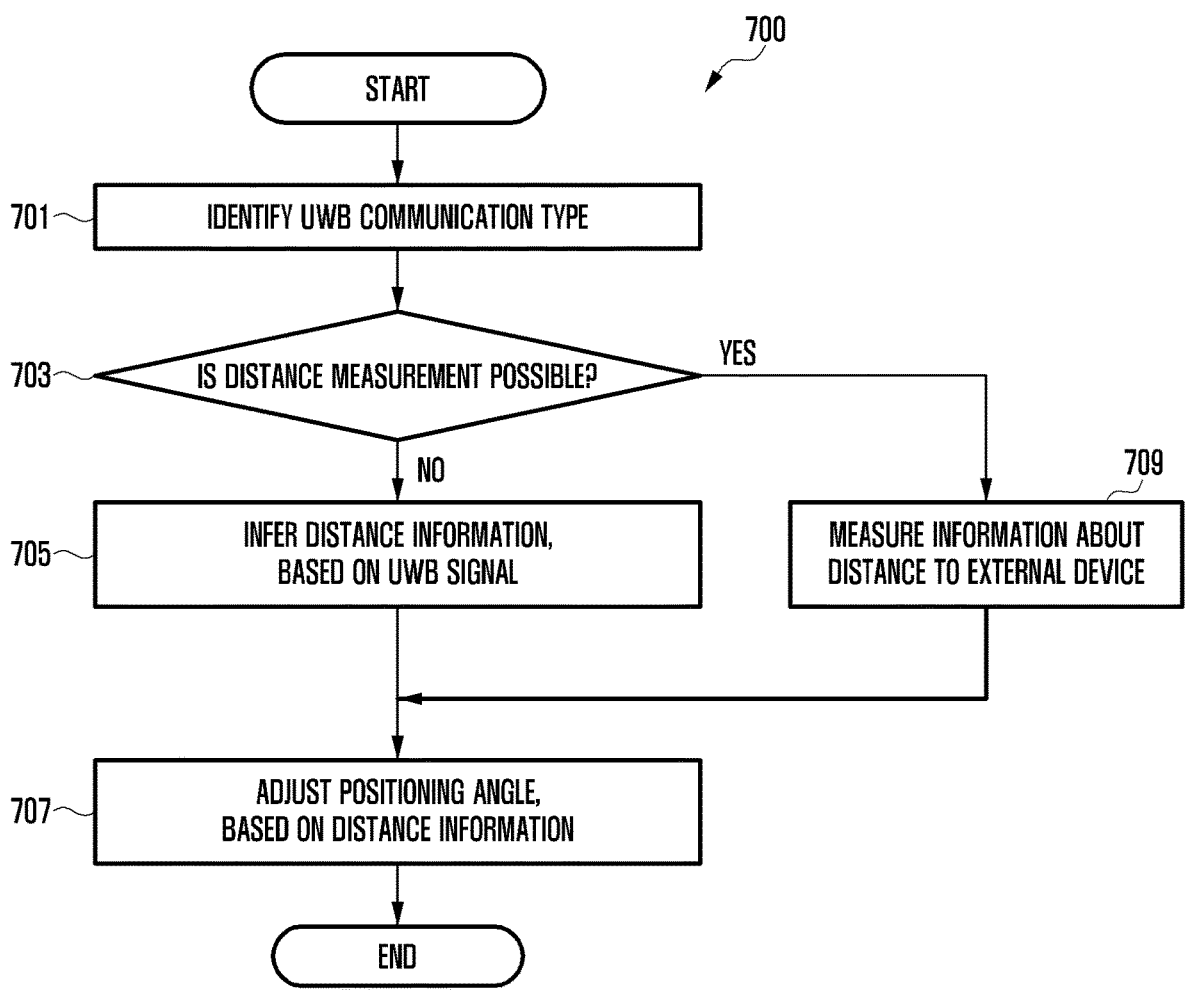
FIG. 7 is a flowchart illustrating a positioning angle adjustment method of an electronic device according to various embodiments.

FIG. 7 is a flowchart 700 illustrating a positioning angle adjustment method of an electronic device according to various embodiments.

Referring to FIG. 7, in operation 701, a processor (e.g., the processor 120 of FIG. 1) of the electronic device (e.g., the electronic device 101 of FIG. 1) according to various embodiments may identify the UWB communication type of the external device. The external device refers to a first external device 401, a second external device 403, or a third external device 405 of FIG. 4, and may be a device that performs UWB communication with the electronic device 101. The processor 120 may identify a configured UWB communication type when establishing UWB communication with the external device. The UWB communication type may include at least one of SS-TWR, DS-TWR, advertisement, UL TDoA, or DL TDoA.

According to various embodiments, when the UWB communication type is SS-TWR or DS-TWR, the processor 120 may establish UWB communication using BLE or Wi-Fi before activating an RX module of a UWB module 220. When the UWB communication is completely established, the processor 120 may activate the UWB communication, thereby performing the UWB communication with the at least one external device. When the UWB communication type is advertisement, UL TDoA, or DL TDoA, the processor 120 may start UWB communication using a predefined (or pre-agreed) configuration.

In operation 703, the processor 120 may determine whether measurement of the distance to the external device is possible, based at least in part on the identified UWB communication type. For example, among the UWB communication types, SS-TWR, DS-TWR, UL TDoA, or DL TDoA may enable measurement of the distance or angle with an external device. Advertisement enables measurement of the angle with an external device, but may not enable measurement of the distance.

When the UWB communication type of the external device corresponds to a type not supporting distance information (e.g., advertisement), the processor 120 may determine that the measurement of the distance is not possible. When the measurement of the distance to the external device is impossible, the processor 120 may perform operation 705. When the UWB communication type of the external device corresponds to a type supporting distance information (e.g., any one of SS-TWR, DS-TWR, UL TDoA, or DL TDoA), the processor 120 may determine that the measurement of the distance is possible. When the measurement of the distance to the external device is possible, the processor 120 may perform operation 709.

When the measurement of the distance is impossible, the processor 120 may infer the distance to the external device, based at least in part on a UWB signal in operation 705. The processor 120 may obtain or estimate and support the distance to the external device through communication with a device providing a relative or absolute location, such as Bluetooth, Wi-Fi, Radar, and an indoor GPS. When the UWB communication type is a type not supporting distance information, the UWB signal may include at least one of a timestamp, angle information (e.g., an azimuth and/or an elevation), an RSSI, SNR information (e.g., a first SNR, a main SNR, and a total SNR), or a transmit power (e.g., TX Power).

When the UWB communication type is a type not supporting distance information, the processor 120 may estimate (or calculate) the distance to the external device, based at least in part on signal strength (e.g., RSSI or SNR information) included in the UWB signal. The processor 120 may infer the distance to the external device, based at least in part on a Friis formula (e.g., Friis's path loss formula). Since a time difference occurs in received timestamp according to a difference in distance from each external device, the processor 120 may infer the distance to the external device, based at least in part on the time difference in the received timestamp.

To measure the distance using a timestamp, time synchronization between the electronic device 101 and the external device needs to be performed first. However, in a type not supporting distance information, the electronic device 101 only receives a UWB signal from the external device and cannot transmit a UWB signal thereto, making it difficult to achieve time synchronization. When the UWB communication type is a type not supporting distance information, the processor 120 may estimate the distance to the external device, based at least in part on the signal strength included in the UWB signal. According to various embodiments, the processor 120 may control (or change or adjust) a measurement angle, based at least in part on the signal strength without estimating the distance through the signal strength.

When the measurement of the distance is possible, the processor 120 may measure the distance to the external device, based at least in part on the UWB signal in operation 709. When the UWB communication type is a type supporting distance information (e.g., SS-TWR or DS-TWR), the UWB signal may include at least one of time information, angle information (e.g., an azimuth and an elevation), an RSSI, SNR information, or a transmit power. When the UWB communication type is SS-TWR, the time information may include at least one of a time when a poll message is received, a time when a response message is transmitted, or a processing time required to receive the poll message and to transmit the response message. The processor 120 may measure the distance to the external device, based at least in part on a time in which the external device receives a poll message and transmits a response message.

When the UWB communication type is a type supporting distance information (e.g., UL TDoA or DL TDoA), the UWB signal may include at least one of a timestamp, angle information (e.g., an azimuth and an elevation), an RSSI, SNR information, or a transmit power. The processor 120 may measure the distance to the external device, based at least in part on the timestamp included in the UWB signal. The timestamp may include time information about transmission of the UWB signal or reception of the UWB signal.

In operation 707, the processor 120 may adjust a positioning angle, based at least in part on the distance information. The positioning angle is different from a UWB communication-perceivable range, and may be, for example, may be smaller than the UWB communication-perceivable range. The positioning angle may include an azimuth (e.g., a horizontal angle) and an elevation (e.g., a vertical angle). The positioning angle may be configured such that the azimuth and the elevation have the same range, or the azimuth or the elevation may be separately configured. When the positioning angle is changed, the processor 120 may change at least one of the azimuth or the elevation of the positioning angle. The processor 120 may adjust the positioning angle differently, based at least in part on the distance to the external device.

For example, when the distance to the external device is a first distance, the processor 120 may change the positioning angle by applying a first offset. When the distance to the external device exceeds the first distance and is less than or equal to a second distance, the processor 120 may change the positioning angle by applying a second offset. When the distance to the external device exceeds the second distance, the processor 120 may change the positioning angle by applying a third offset. The first offset to the third offset may be different angles. The first offset may have the narrowest angle range, and the third offset may have the widest angle range. The processor 120 may repeat an operation of applying the first offset to the third offset to the positioning angle a specified number of times, thereby identifying whether a configured condition is satisfied.

For example, to transmit data to an external device, at least one external device may need to be retrieved. When an external device included in the positioning angle is not retrieved or a retrieved external device does not satisfy the configured condition, the processor 120 may adjust the positioning angle. The processor 120 may differently adjust the adjustment range or frequency of the positioning angle, based at least in part on the distance to the external device. For example, the processor 120 may adjust the positioning angle to a first angle (e.g., −10° to 10°) when the external device is at a distance of 50 cm, may adjust the positioning angle to a second angle (e.g., −20° to 20°) when the external device is at a distance of 1 m, and may adjust the positioning angle to a third angle (e.g., −30° to 30°) when the external device is at a distance of 10 m. Further, when external devices at different distances are in the same angle range, the processor 120 may request a change of the location of the electronic device according to angle information (e.g., an azimuth and/or an elevation) or distance information of the external devices, or a user may select one external device.

Figure 8B:
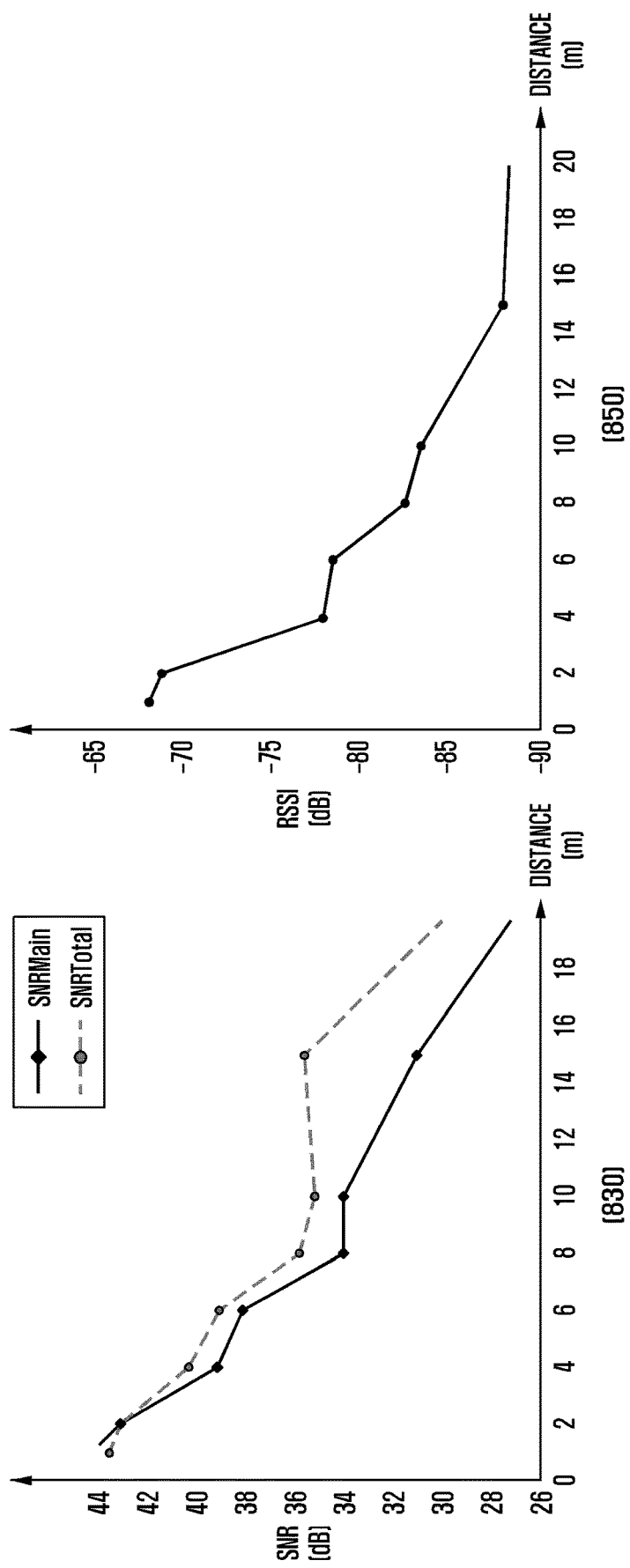
Figure 8C:
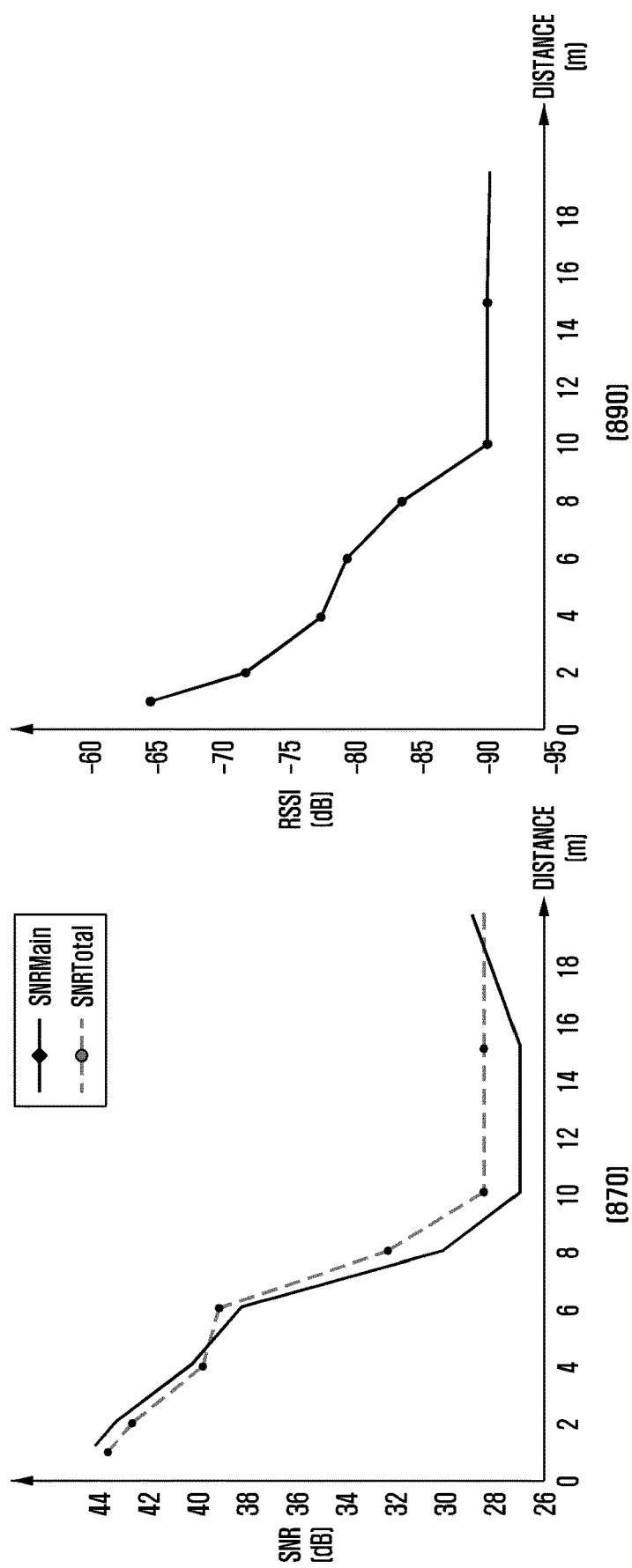

FIG. 8A to FIG. 8C illustrate correlations between signal strength and a distance according to various embodiments. FIG. 8A to FIG. 8C show results obtained when the Friis formula is actually measured, and when a UWB communication method by which a distance cannot be obtained is used, a distance may be estimated based at least in part on this formula.

FIG. 8A is a table 810 showing a correlation between signal strength and a distance.

Referring to FIG. 8A, the table 810 may be divided into indoor values or outdoor values. Indoors or outdoors, correlations between signal strength (e.g., an SNR and an RSSI) and a distance may be the same or similar. For example, as the signal strength increases, the distance between an electronic device (e.g., the electronic device 101 of FIG. 1) and an external device (e.g., the first external device 401 of FIG. 4) decreases.

FIG. 8B is a graph illustrating a correlation between signal strength and a distance.

Referring to FIG. 8B, a first graph 830 illustrates a correlation between an SNR and the distance. As the SNR increases, the distance between the electronic device 101 and the first external device 401 decreases. The first graph 830 shows a main SNR and a total SNR in the table 810, and the main SNR and the total SNR have similar patterns such that the values thereof decrease as the distance increases. A second graph 850 illustrates a correlation between an RSSI and the distance. As the RSSI increases, the distance between the electronic device 101 and the first external device 401 decreases.

FIG. 8C is a graph illustrating a correlation between signal strength and a distance.

Referring to FIG. 8C, a third graph 870 illustrates a correlation between an SNR and the distance. As the SNR increases, the distance between the electronic device 101 and the first external device 401 decreases. The third graph 870 shows a main SNR and a total SNR in the table 810, and the main SNR and the total SNR have similar patterns such that the values thereof decrease as the distance increases. A fourth graph 890 illustrates a correlation between an RSSI and the distance. As the RSSI increases, the distance between the electronic device 101 and the first external device 401 decreases.

FIG. 9 is a flowchart 900 illustrating a method for selecting or re-retrieving an external device by an electronic device according to various embodiments. FIG. 9 may specify operation 505 and operation 507 of FIG. 5.

Referring to FIG. 9, in operation 901, a processor (e.g., the processor 120 of FIG. 1) of the electronic device (e.g., the electronic device 101 of FIG. 1) according to various embodiments may determine whether an external device is included in a positioning angle. The positioning angle may be smaller than a UWB communication-perceivable range corresponding to the front of the electronic device 101. The positioning angle may be configured based at least in part on a table generated with a distance value, an RSSI, and an SNR, and may include an azimuth (e.g., a horizontal angle) and an elevation (e.g., a vertical angle). The positioning angle may be configured such that the azimuth and the elevation have the same range, or the azimuth or the elevation may be separately configured. When the positioning angle is changed, the processor 120 may change at least one of the azimuth or the elevation of the positioning angle. The processor 120 may determine whether there is an external device included in the positioning angle among external devices retrieved to be included in the UWB communication-perceivable range. Operation 901 may be performed when at least one external device is retrieved within the UWB communication-perceivable range.

The processor 120 may perform operation 903 when the external device is included in the positioning angle, and may perform operation 902 when the external device is not included in the positioning angle.

When the external device is included in the positioning angle, the processor 120 may determine whether the number of external devices included in the positioning angle is a configured number in operation 903. For a user to transmit data through the electronic device 101, at least one external device may need to be retrieved. The configured number may be configured by the user, or may be configured by default in the electronic device 101.

When the number of external devices included in the positioning angle is the configured number, the processor 120 may perform operation 905, and when the number of external devices included in the positioning angle is not the configured number, the processor 120 may perform operation 904.

When the number of external devices included in the positioning angle is the configured number, the processor 120 may perform an operation related to the retrieved external device in operation 905. For example, when there is only one retrieved external device, the processor 120 may execute a function interworking with the retrieved external device, may display an application screen, or may access a site. For example, when only a TV is selected as the retrieved external device, the processor 120 may drive and display a TV remote control application. Alternatively, when an electronic board is selected and a product/menu is displayed on the electronic board, the processor 120 may execute and display a URL for ordering the product.

According to various embodiments, the processor 120 may display the retrieved external device on a display (e.g., the display module 160 of FIG. 1). When the number of external devices included in the positioning angle is the configured number, the processor 120 may determine that the retrieved external device satisfies (or corresponds to) a configured condition. When the retrieved external device satisfies the configured condition, the processor 120 may provide a user interface for selecting an external device. The processor 120 may display a user interface including information (e.g., a name (e.g., product name), a serial number, and/or a distance) about the external device on the display module 160.

The processor 120 may select an external device, based at least in part on a user input. For example, when there is one retrieved external device, the user may select the retrieved external device. Alternatively, when the number of retrieved external devices exceeds one, the user may select any one external device from an external device list. The processor 120 may transmit data requested by the user to the selected external device. For data transmission, Bluetooth or Wi-Fi may be used. According to an embodiment, when there is one retrieved external device, the processor 120 may execute or perform a program or function agreed with the selected device without displaying the external device list. According to an embodiment, the user may request re-retrieval instead of selecting an external device.

When the external device is not included in the positioning angle, the processor 120 may change the positioning angle by applying a first offset in operation 902. The processor 120 may change the positioning angle in various manners, for example, sequentially change the positioning angle or changing a unit of changed value (e.g., 10°→8°→5°). The processor 120 may change at least one of the azimuth and the elevation of the positioning angle. The retrieved external device may be included in the UWB communication-perceivable range, but may not be included in the positioning angle. In this case, the processor 120 may increase the positioning angle by applying the first offset to the positioning angle so that the external device not included in the positioning angle is retrieved. The increased positioning angle (e.g., a second positioning angle) may be greater than the previous positioning angle (e.g., a first positioning angle). After changing the positioning angle, the processor 120 may perform operation 909.

When the number of external devices is not the configured number, the processor 120 may change the positioning angle by applying a second offset in operation 904. The processor 120 may change at least one of the azimuth and the elevation of the positioning angle. The processor 120 may change the positioning angle in various manners, for example, sequentially change the positioning angle or changing a unit of changed value (e.g., 10°→8°→5°). The number of external devices included in the positioning angle may be greater than the configured number. In this case, the processor 120 may reduce the positioning angle to reduce the number of external devices included in the positioning angle. The processor 120 may reduce the positioning angle by applying the second offset to the positioning angle. The reduced positioning angle (e.g., a third positioning angle) may be smaller than the previous positioning angle (e.g., the first positioning angle). The positioning angle after which the first offset is applied may be greater than the positioning angle after which the second offset is applied. After changing the positioning angle, the processor 120 may perform operation 909. Alternatively, the processor 120 may determine one external device among previously retrieved external devices instead of performing re-retrieval.

In operation 909, the processor 120 may re-retrieve an external device, based at least in part on the changed positioning angle. The external device may or may not be included in the previous positioning angle. An external device not retrieved in operation 901 may be retrieved in the positioning angle changed in operation 902. Alternatively, the external device retrieved in operation 901 may not be retrieved in the positioning angle changed in operation 904. After performing operation 909, the processor 120 may return to operation 901 and may determine whether the external device retrieved based at least in part on the changed positioning angle satisfies the configured condition (e.g., operation 901 and operation 903). According to an embodiment, the processor 120 may repeat an operation of re-retrieving an external device (e.g., an operation of changing the positioning angle (e.g., operation 902 or operation 904) and an operation of determining whether an external device retrieved based at least in part on the changed positioning angle satisfies the configured condition (e.g., operation 901 and operation 903)) a given number of times.

Figure 10:
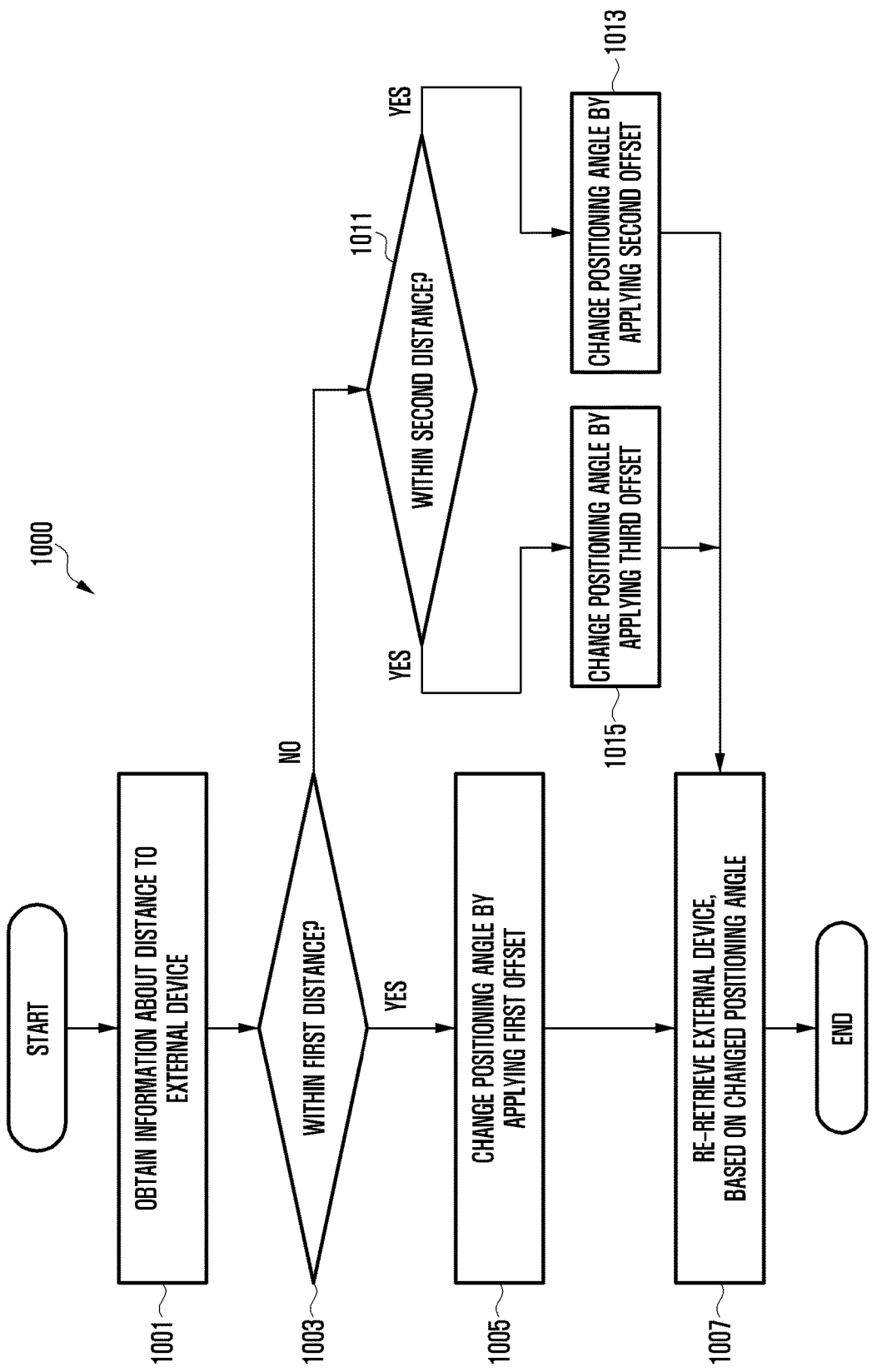
FIG. 10 is a flowchart illustrating a method for changing a positioning angle according to a distance by an electronic device according to various embodiments.

FIG. 10 is a flowchart 1000 illustrating a method for changing a positioning angle according to a distance by an electronic device according to various embodiments. FIG. 10 may be performed when an external device does not correspond to a configured condition.

Referring to FIG. 10, in operation 1001, a processor (e.g., the processor 120 of FIG. 1) of the electronic device (e.g., the electronic device 101 of FIG. 1) according to various embodiments may obtain distance information of an external device. To this end, the processor 120 may perform the operations of FIG. 7. For example, the processor 120 may identify the UWB communication type of the external device and may obtain the distance information using different methods according to the identified UWB communication type. When establishing UWB communication with the external device, the processor 120 may identify the type of the established UWB communication. The UWB communication type may include at least one of SS-TWR, DS-TWR, advertisement, UL TDoA, or DL TDoA.

According to various embodiments, among the UWB communication types, SS-TWR, DS-TWR, UL TDoA, or DL TDoA may enable measurement of the distance or angle with the external device. Advertisement enables measurement of the angle with the external device, but may not enable measurement of the distance. When the UWB communication type of the external device corresponds to a type not supporting distance information (e.g., advertisement), the processor 120 may determine that distance measurement is not possible. When distance measurement of the external device is impossible, the processor 120 may estimate (or calculate) the distance to the external device, based at least in part on signal strength (e.g., RSSI or SNR information) included in a UWB signal. When the UWB communication type is a type supporting distance information (e.g., SS-TWR or DS-TWR), the processor 120 may measure the distance to the external device, based at least in part on time information included in the UWB signal. When the UWB communication type is a type supporting distance information (e.g., UL TDoA or DL TDoA), the processor 120 may measure the distance to the external device, based at least in part on a timestamp included in the UWB signal.

In operation 1003, the processor 120 may determine whether the distance information of the external device is within a first distance. The processor 120 may perform operation 1005 when the distance information of the external device is within the first distance, and may perform operation 1011 when the distance information of the external device is not within the first distance (e.g., exceeds the first distance).

When the distance information of the external device is within the first distance, the processor 120 may change a positioning angle by applying a first offset in operation 1005. The first distance may be the shortest distance for changing the positioning angle. The processor 120 may increase or reduce the positioning angle by applying the first offset. A positioning angle after which the first offset is applied (e.g., a second positioning angle) may be greater or smaller than the previous positioning angle (e.g., a first positioning angle). For example, when the retrieved external device is not included in the positioning angle, the positioning angle may be increased by applying the first offset. When the retrieved external device is included in the positioning angle but there is a plurality of retrieved external devices, the positioning angle may be reduced by applying the first offset. After changing the positioning angle, the processor 120 may perform operation 1007.

When the distance information of the external device is not within the first distance (e.g., exceeds the first distance), the processor 120 may determine whether the distance information of the external device is within a second distance in operation 1011. The second distance may refer to a distance greater than the first distance. The processor 120 may perform operation 1013 when the distance information of the external device is within the second distance, and may perform operation 1015 when the distance information of the external device is not within the second distance (e.g., exceeds the second distance).

When the distance information of the external device is within the second distance, the processor 120 may change the positioning angle by applying a second offset in operation 1013. The processor 120 may increase or reduce the positioning angle by applying the second offset. For example, when the retrieved external device is not included in the positioning angle, the processor 120 may increase the positioning angle by applying the second offset. When the retrieved external device is included in the positioning angle but there is a plurality of retrieved external devices, the processor 120 may reduce the positioning angle by applying the second offset. The second offset may be greater than the first offset. For example, when the first offset is −3° to +3°, the second offset may be −4.5° to +4.5°. After changing the positioning angle, the processor 120 may perform operation 1007.

When the distance information of the external device is not within the second distance (e.g., exceeds the second distance), the processor 120 may change the positioning angle by applying a third offset in operation 1015. The processor 120 may increase or reduce the positioning angle by applying the third offset. For example, when the retrieved external device is not included in the positioning angle, the processor 120 may increase the positioning angle by applying the third offset. When the retrieved external device is included in the positioning angle but there is a plurality of retrieved external devices, the processor 120 may reduce the positioning angle by applying the third offset. The third offset may be greater than the second offset. For example, when the second offset is −4.5° to +4.5°, the third offset may be −7.5° to +7.5°. After changing the positioning angle, the processor 120 may perform operation 1007.

After changing the positioning angle, the processor 120 may re-retrieve an external device, based at least in part on the changed positioning angle in operation 1007. The processor 120 may change the positioning angle by applying different offsets to the positioning angle according to the distance to the external device. An external device that has not been retrieved may be retrieved in the changed positioning angle. Alternatively, the retrieved external device may not be retrieved in the changed positioning angle. The processor 120 may determine whether the external device retrieved based at least in part on the changed positioning angle satisfies the configured condition (e.g., operation 901 and operation 903 of FIG. 9).

The processor 120 may repeat the operations of applying the first offset to the third offset to the positioning angle a specified number of times, thereby identifying whether the configured condition is satisfied.

Although FIG. 10 shows that the positioning angle is changed according to the distance, the processor 120 may change the positioning angle, based at least in part on the strength of a signal with an external device. The strength of the signal may include an RSSI or SNR included in a UWB signal. The processor 120 may estimate the distance from the signal strength and may adjust the positioning angle according to the estimated distance.

FIG. 11 illustrates an example in which an electronic device changes a positioning angle according to a distance according to various embodiments.

Referring to FIG. 11, a first positioning angle table 1110 shows an example of changing a positioning angle differently, based at least in part on a distance to an external device. For example, a first positioning angle (−15° to +15°) may be configured as a default in the electronic device (e.g., the electronic device 101 of FIG. 1). When the distance to the external device is a first distance (e.g., less than 1 m), a processor of the electronic device 101 (e.g., the processor 120 of FIG. 1) may change the first positioning angle to a second positioning angle (−18° to +18°) by applying a first offset (e.g., −3° to +3°) to the first positioning angle. Alternatively, when the distance to the external device is a second distance (e.g., greater than 1 m and less than 3 m), the processor 120 may change the first positioning angle to the second positioning angle (−20° to +20°) by applying a second offset (e.g., −5° to +5°) to the first positioning angle. When the distance to the external device is a third distance (e.g., greater 3 m), the processor 120 may change the first positioning angle to the second positioning angle (−23° to +23°) by applying a third offset (e.g., −8° to +8°) to the first positioning angle.

A second positioning angle table 1130 shows an example of changing a positioning angle differently, based at least in part on the strength of a signal with the external device. The strength of the signal may include an RSSI or SNR included in a UWB signal. The processor 120 may change the positioning angle, based at least in part on the strength of the signal without estimating the distance from the strength of the signal. Although the table illustrates the RSSI, the SNR may equally or similarly apply.

For example, when the strength of the signal with the external device is a first signal strength (e.g., greater than −75 dB), the processor 120 may change the first positioning angle to the second positioning angle (−18° to +18°) by applying the first offset (e.g., −3° to +3°) to the first positioning angle. Alternatively, when the strength of the signal with the external device is a second signal strength (e.g., greater than −85 dB and less than −75 dB), the processor 120 may change the first positioning angle to the second positioning angle (−20° to +20°) by applying the second offset (e.g., −5° to +5°) to the first positioning angle. When the strength of the signal with the external device is a third signal strength (e.g., greater than −90 dB and less than −85 dB), the processor 120 may change the first positioning angle to the second positioning angle (−23° to +23°) by applying the third offset (e.g., −8° to +8°) to the first positioning angle.

Numerical values shown in the first positioning angle table 1110 or the second positioning angle table 1130 are only examples to assist understanding of the disclosure, and the disclosure is not limited by the examples. The positioning angle may be configured based at least in part on a table generated with a distance value, an RSSI, and an SNR, and may include an azimuth (e.g., a horizontal angle) and an elevation (e.g., a vertical angle). The positioning angle may be configured such that the azimuth and the elevation have the same range, or the azimuth or the elevation may be separately configured. When the positioning angle is changed, the processor 120 may change at least one of the azimuth or the elevation of the positioning angle.

Figure 12:
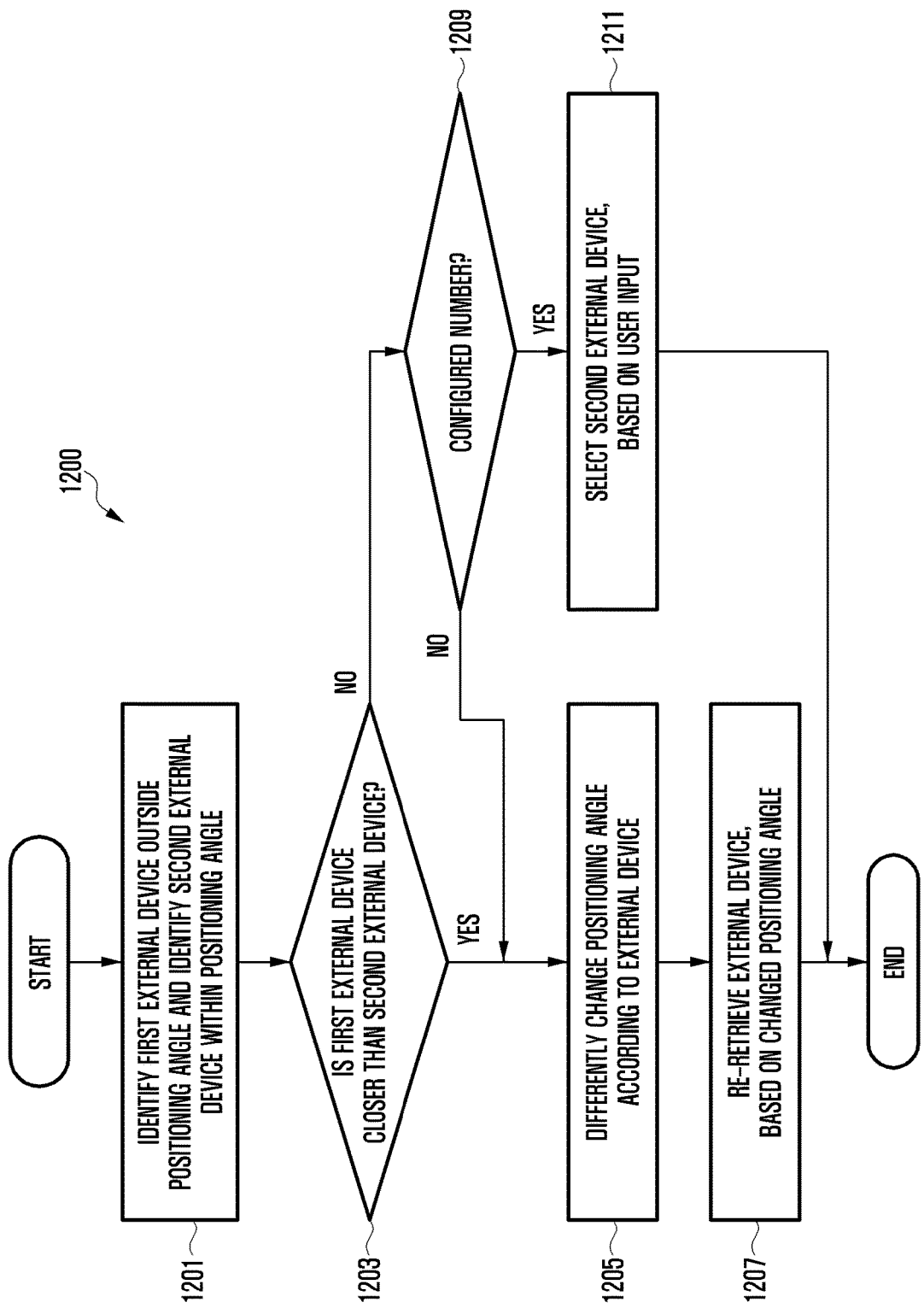
FIG. 12 is a flowchart illustrating a method for differently changing a positioning angle for each external device by an electronic device according to various embodiments.

FIG. 12 is a flowchart 1200 illustrating a method for differently changing a positioning angle for each external device by an electronic device according to various embodiments.

Referring to FIG. 12, in operation 1201, a processor (e.g., the processor 120 of FIG. 1) of the electronic device (e.g., the electronic device 101 of FIG. 1) according to various embodiments may retrieve a first external device outside a positioning angle and a second external device within the positioning angle. The first external device and the second external device may be included in a UWB communication-perceivable range corresponding to the front of the electronic device 101. The positioning angle is different from the UWB communication-perceivable range, and may be, for example, smaller than the UWB communication-perceivable range.

The first external device may be included in the UWB communication-perceivable range, but may not be included in the positioning angle. The second external device may be included in both the UWB communication-perceivable range and the positioning angle. The positioning angle may include an azimuth (e.g., a horizontal angle) and an elevation (e.g., a vertical angle).

The positioning angle may be configured such that the azimuth and the elevation have the same range, or the azimuth or the elevation may be separately configured. When the positioning angle is changed, the processor 120 may change at least one of the azimuth or the elevation of the positioning angle. In UWB communication, the processor 120 may retrieve an external device using the positioning angle configured as a default in the electronic device 101.

According to various embodiments, the processor 120 may determine whether to select the first external device, based at least in part on whether the first external device out of the positioning angle is within a certain range, whether the first external device is a device providing a service related to an application being executed in the electronic device 101, or a user input. The processor 120 may display that the first external device and the second external device are retrieved, and may report a change of a pointing direction of the electronic device 101 when the first external device is intended to be selected.

In operation 1203, the processor 120 may determine whether the first external device is closer than the second external device. When the first external device is located outside the positioning angle but is located closer than the second external device, a user may be highly likely to select the first external device. When a plurality of external devices is retrieved (or identified), the processor 120 may change the positioning angle, based at least in part on the distance between the external device and the electronic device 101, in order to increase accuracy in selecting an external device.

The processor 120 may perform operation 1205 when the first external device is closer than the second external device, and may perform operation 1209 when the first external device is not closer than the second external device.

When the first external device is closer than the second external device, the processor 120 may differently change the positioning angle depending on the external devices in operation 1205. For example, the processor 120 may apply a first positioning angle to the first external device, and may apply a second positioning angle to the second external device. The first positioning angle may be different from the second positioning angle. For example, the processor 120 may apply the first positioning angle, obtained by increasing positioning angle, to the first external device, and may apply the second positioning angle, obtained by reducing the positioning angle, to the second external device.

In operation 1207, the processor 120 may re-retrieve an external device, based at least in part on the changed positioning angle. The first external device is not included in the previous positioning angle, and the second external device is included in the previous positioning angle. However, after changing the positioning angle, the first external device may be included in the first positioning angle, and the second external device may not be included in the second positioning angle. There may be one first external device or second external device, or a plurality of first external devices or second external devices. For example, there may be one first external device, and two second external devices. In the changed positioning angle, one of the two external devices corresponding to the second external devices may be retrieved, and the other external device may not be retrieved.

When the first external device is not closer than the second external device, the processor 120 may determine whether the number of the second external devices is a configured number in operation 1209. There may be a plurality of first external devices or second external devices. The processor 120 may perform operation 1211 when the number of the second external devices is the configured number, and may perform operation 1205 when the number of the second external devices is not the configured number. When the number of the second external devices is not the configured number (e.g., two or three), the processor 120 may perform operation 1205 to change the positioning angle for the second external devices so that second external devices may be retrieved.

When the number of the second external devices is the configured number, the processor 120 may select the second external devices, based at least in part on a user input in operation 1211. The processor 120 may provide a user interface including the second external devices existing in the positioning angle. The user may select the retrieved second external devices or may request re-retrieval of an external device.

Although FIG. 12 shows an example in which a positioning angle is differently applied according to a distance, the processor 120 may change the positioning angle, based at least in part on the strength of a signal with an external device. The strength of the signal may include an RSSI or SNR included in a UWB signal. The processor 120 may estimate a distance from the strength of the signal, and may adjust the positioning angle according to the estimated distance. Alternatively, the processor 120 may change the positioning angle, based at least in part on the strength of the signal, without estimating the distance from the strength of the signal.

Figure 13A:
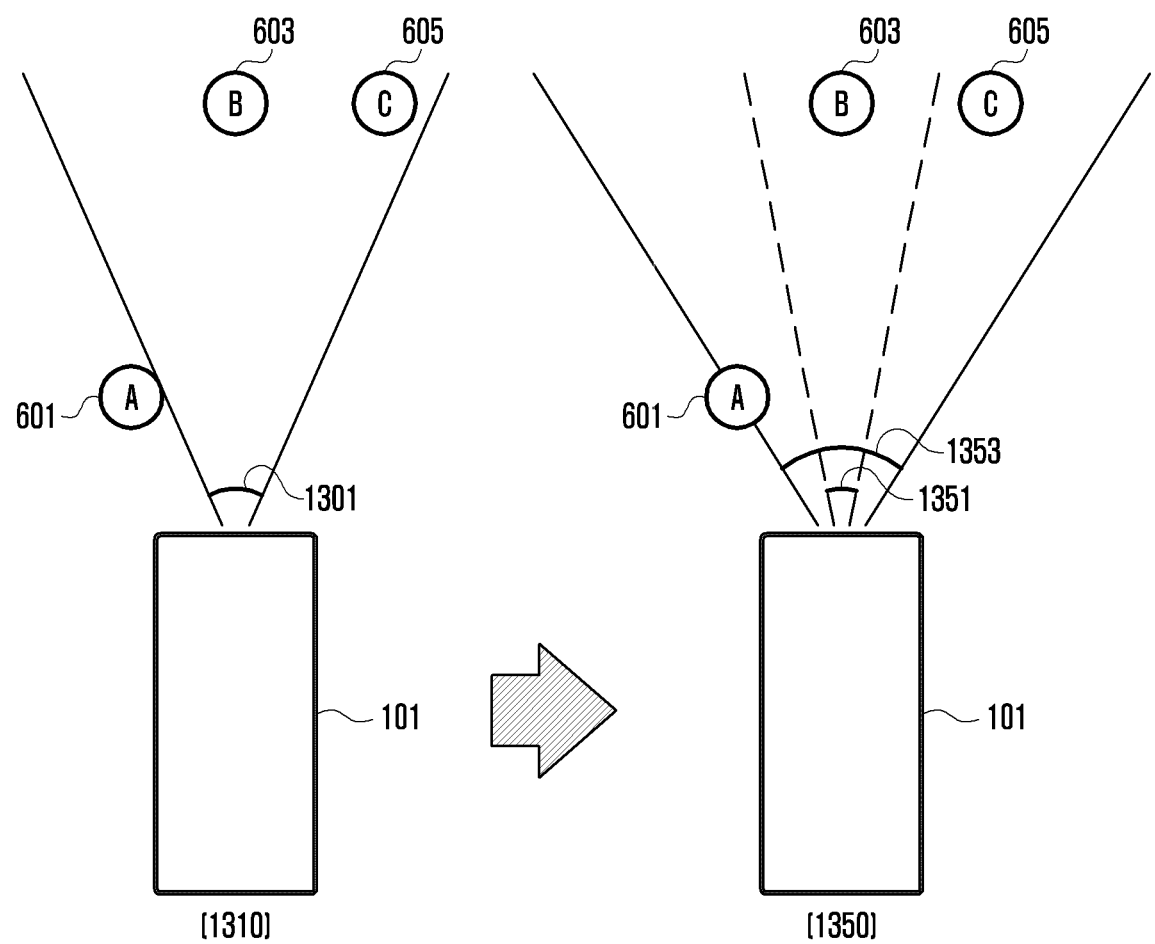
FIG. 13A illustrates an example in which an electronic device differently changes a positioning angle for each external device according to various embodiments.

FIG. 13A illustrates an example in which an electronic device differently changes a positioning angle for each external device according to various embodiments.

Referring to FIG. 13A, the electronic device (e.g., the electronic device 101 of FIG. 1) according to various embodiments may retrieve a first external device 601, a second external device 603, and a third external device 605 included in a UWB communication-perceivable range corresponding to the front of the electronic device 101. Referring to a first reference numeral 1310, the first external device 601 may located (or present) outside a positioning angle 1301, and the second external device 603 and the third external device 605 may be located within the positioning angle 1301. The positioning angle 1301 is different from the UWB communication-perceivable range, and may be, for example, smaller than the UWB communication-perceivable range.

Referring to the first reference numeral 1310, when the first external device 601 is located outside the positioning angle 1301, and the second external device 603 and the third external device 605 are located within the positioning angle 1301, the electronic device 101 may determine whether the first external device 601 is closer than the second external device 603 or the third external device 605. For example, when the signal strength of the first external device 601 outside the positioning angle 1301 is a specified value or greater (e.g., when the first external device 601 is determined to be super-close), the electronic device 101 may determine whether the first external device 601 is closer than the second external device 603 or the third external device 605.

When the first external device 601 is closer than the second external device 603 or the third external device 605, the electronic device 101 may differently change the positioning angle depending on the external devices. For example, the electronic device 101 may apply a first positioning angle 1353 to the first external device 601 and may apply a second positioning angle 1351 to the second external device 603 or the third external device 605. For example, referring to a second reference numeral 1350, the electronic device 101 may apply the first positioning angle 1353, increased from the positioning angle 1301, to the first external device 601 that is close to the electronic device 101. Referring to the second reference numeral 1350, when the second external device 603 and the third external device 605 exist at a long distance from the electronic device 101, the electronic device 101 may apply the second positioning angle 1351, reduced from the positioning angle 1301, to the second external device 603 and the third external device 605. The electronic device 101 may re-retrieve an external device, based at least in part on the changed (or applied) positioning angle.

The first external device 601 may not be included in the positioning angle 1301 (e.g., the previous positioning angle), and the second external device 603 and the third external device 605 may be included in the positioning angle 1301. Regarding the changed positioning angle, the first external device 601 may be included in the first positioning angle 1353, the second external device 603 may be included in the second positioning angle 1351, and the third external device 605 may not be included in the second positioning angle 1351.

When FIG. 13A is applied to an actual service, the processor 120 may identify the first external device 601 newly approaching while retrieving the second external device 603 and the third external device 605 currently lined up at a bus stop. In this case, the processor 120 may increase the positioning angle to be changed to the second positioning angle 1353, or may transmit a command to move behind the second external device 603 and the third external device 605 to the first external device 601.

Figure 13B:
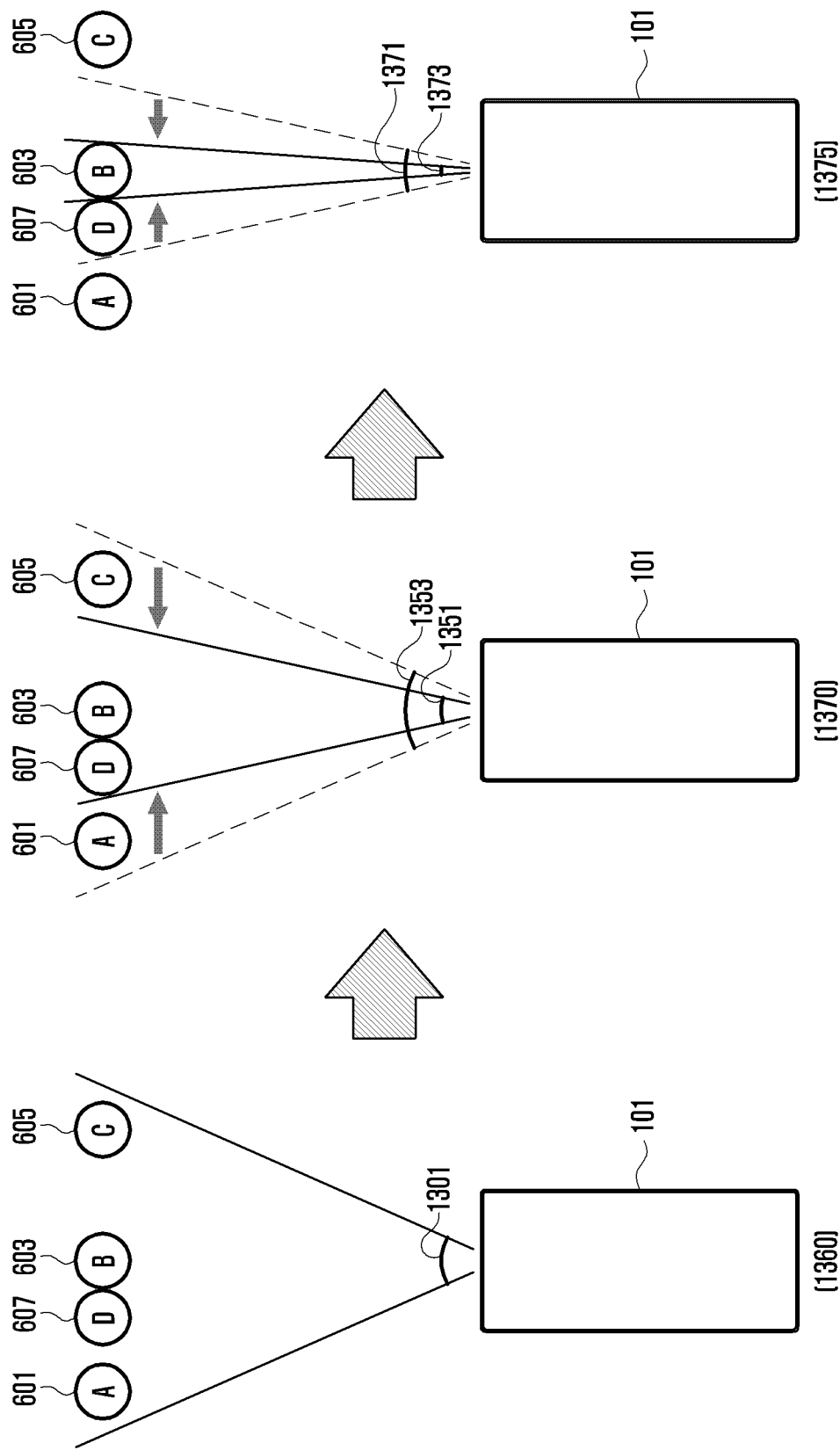
FIG. 13B and FIG. 13C illustrate examples in which an electronic device changes a positioning angle according to various embodiments.
Figure 13C:
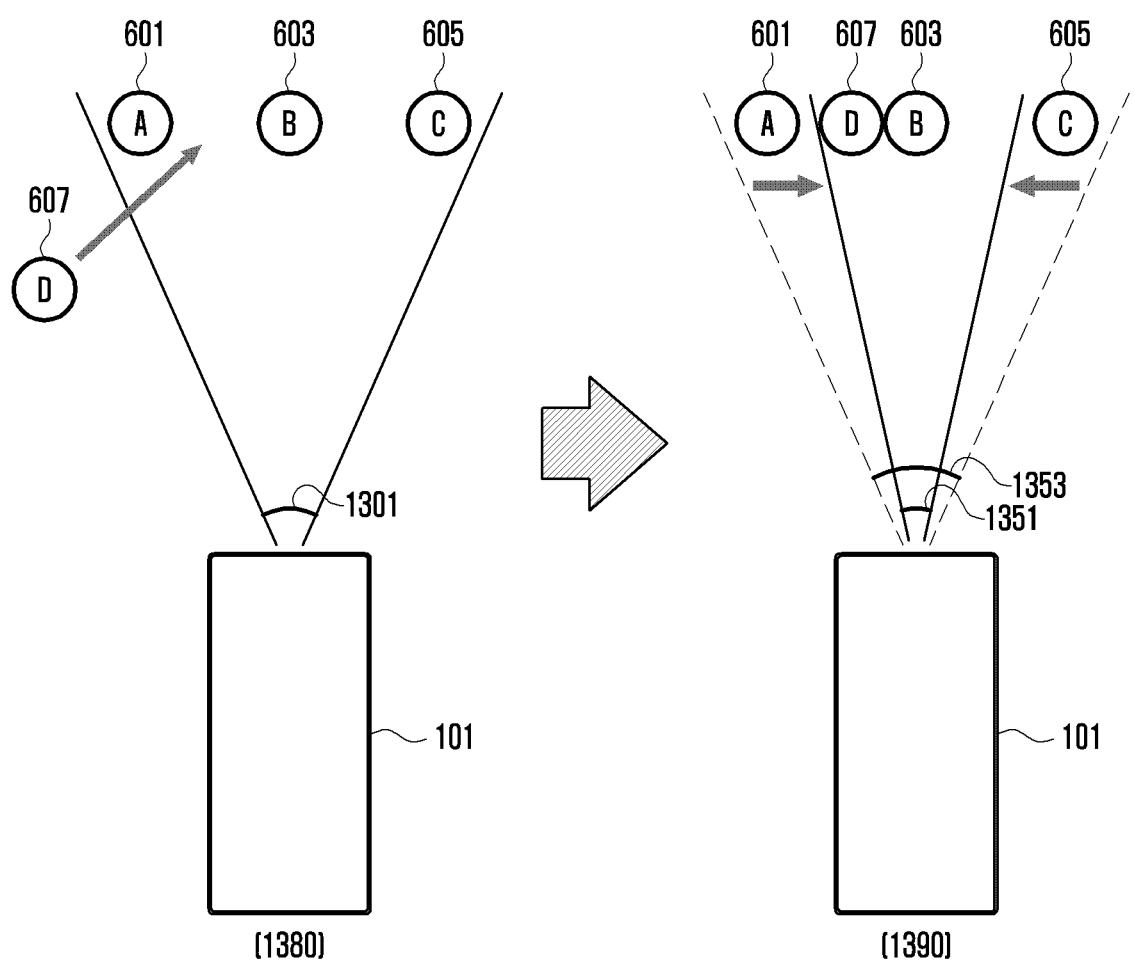

FIG. 13B and FIG. 13C illustrate examples in which an electronic device changes a positioning angle according to various embodiments.

Referring to FIG. 13B, the electronic device 101 may retrieve at least one external device performing UWB communication, and may determine whether the retrieved external device satisfies a configured condition. Referring to a third reference numeral 1360, the electronic device 101 may retrieve a first external device 601, a second external device 603, a third external device 605, and a fourth external device 607 included in a first positioning angle 1301. Referring to the third reference numeral 1360, since the number of external devices included in the positioning angle 1301 is a specified number (e.g., one) or greater, the electronic device 101 may change the positioning angle 1301. The electronic device 101 may change the positioning angle 1301 by stages.

Referring to a fourth reference numeral 1370, the electronic device 101 may change the positioning angle to a second positioning angle 1351, thereby retrieving the second external device 603 and the fourth external device 607. Since two external devices are retrieved in the second positioning angle 1351, the electronic device 101 may change the second positioning angle 1351. Referring to a fifth reference numeral 1375, the electronic device 101 may change the positioning angle to the third positioning angle 1373, thereby retrieving the second external device 603. The electronic device 101 may change the positioning angle by stages until only one external device is retrieved. The electronic device 101 may display the second external device 603 through a display.

Referring to a sixth reference numeral 1380 of FIG. 13C, the electronic device 101 retrieve a first external device 601, a second external device 603, and a third external device 605 included in a positioning angle 1301. A fourth external device 607 may enter the positioning angle 1301. Since a plurality of external devices is included in the positioning angle 1301, the electronic device 101 may change the positioning angle 1301 by stages. Referring to a seventh reference numeral 1390, the electronic device 101 may change the positioning angle to a second positioning angle 1351, thereby retrieving the second external device 603 and the fourth external device 607. The processor 120 may display the second external device 603 and the fourth external device 607 through a display. A user may select one of the second external device 603 or the fourth external device 607.

Figure 14:
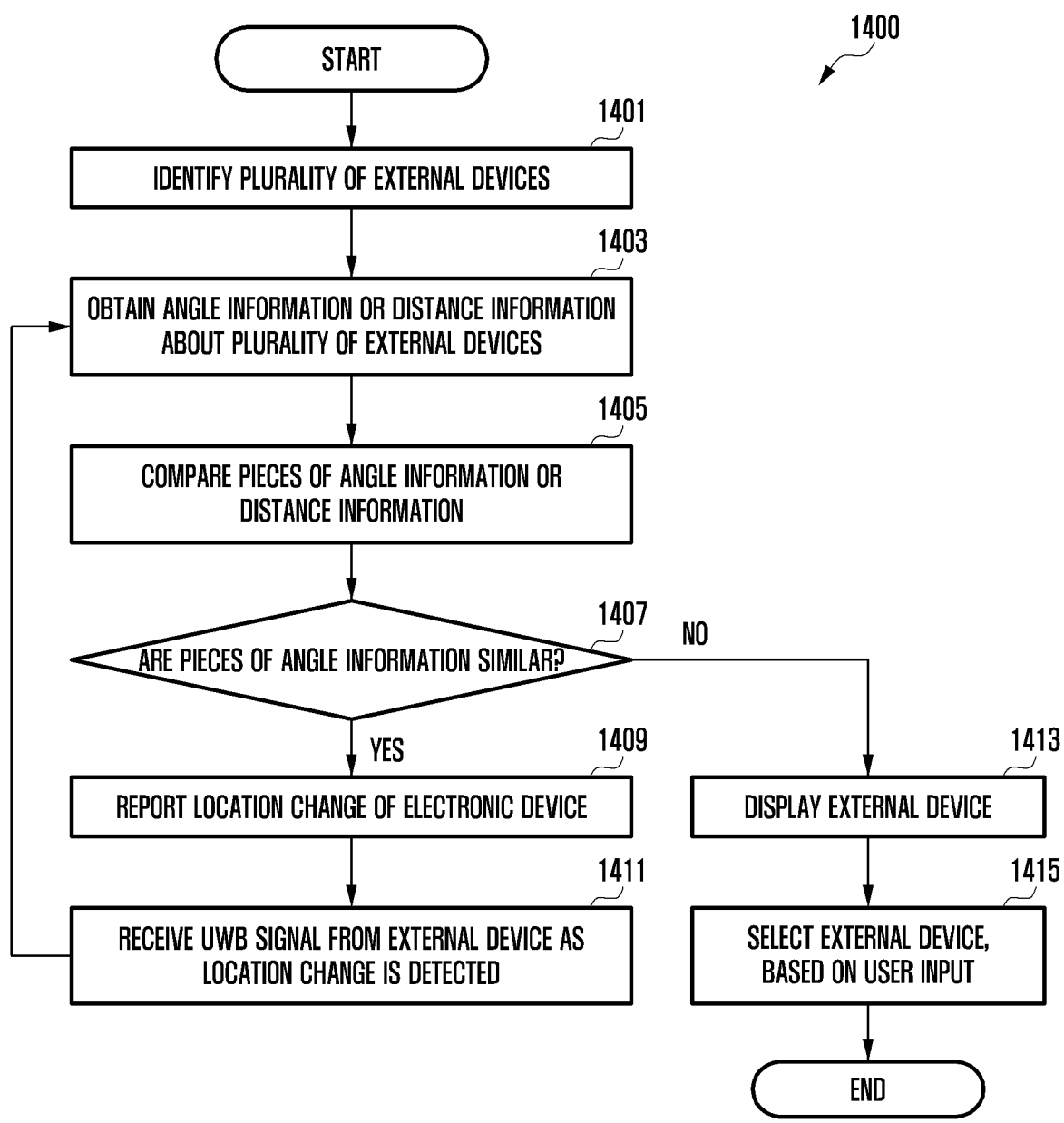
FIG. 14 is a flowchart illustrating a method for retrieving an external device by moving an electronic device according to various embodiments.

FIG. 14 is a flowchart 1400 illustrating a method for retrieving an external device by moving an electronic device according to various embodiments.

Referring to FIG. 14, in operation 1401, a processor (e.g., the processor 120 of FIG. 1) of the electronic device (e.g., the electronic device 101 of FIG. 1) according to various embodiments may retrieve a plurality of external devices. The processor 120 may retrieve a plurality of external devices included in a UWB communication-perceivable range corresponding to the front of the electronic device 101. Alternatively, the processor 120 may retrieve a plurality of external devices included in a positioning angle smaller than the UWB communication-perceivable range.

In operation 1403, the processor 120 may obtain angle information or distance information about the plurality of external devices. The angle information (e.g., an azimuth and/or an elevation) may be included in a UWB signal. The UWB signal may include at least one of time information, a timestamp, the angle information (e.g., the azimuth and/or the elevation), an RSSI, SNR information, or a transmit power. The angle information may be included in the UWB signal regardless of the type of UWB communication. The angle information may have a significant value when a UWB antenna (e.g., UWB antenna 1 221 or UWB antenna 2 223 of FIG. 2) included in the electronic device 101 faces an external device. The processor 120 may measure the slope of the electronic device 101, based at least in part on sensor data obtained through an acceleration sensor or a gyro sensor (e.g., the sensor module 176 of FIG. 1) included in the electronic device 101, and may use the slope of the electronic device 101 for reference when obtaining the angle information.

The distance information may be calculated using the time information or the timestamp included in the UWB signal. When it is difficult to obtain the distance information, the processor 120 may obtain only the angle information. When the UWB communication type is a type supporting distance information (e.g., SS-TWR or DS-TWR), the UWB signal may include at least one of the time information, the angle information, the RSSI, the SNR information, or the transmit power. The processor 120 may measure the distance to the external devices, based at least in part on the time information included in the UWB signal. When the UWB communication type is at least one of advertisement, UL TDoA, or DL TDoA, the UWB signal may include at least one of the timestamp, the angle information, the RSSI, the SNR information, or the transmit power.

When the UWB communication type is a type supporting distance information (e.g., UL TDoA or DL TDoA), the processor 120 may measure the distance to the external device, based at least in part on the timestamp included in the UWB signal. When the UWB communication type is a type not supporting distance information (e.g., advertisement), the processor 120 may estimate (or calculate) the distance to the external devices, based at least in part on signal strength (e.g., the RSSI or SNR information) included in the UWB signal. The processor 120 may infer the distance to the external devices, based at least in part on a Friis formula (e.g., Friis's path loss formula).

In operation 1405, the processor 120 may compare the angle information or the distance information. For example, the plurality of external devices may include a first external device and a second external device. The first external device and the second external device may have different azimuths (e.g., horizontal angles) or elevations (e.g., vertical angles). The processor 120 may compare first angle information about the first external device with second angle information about the second external device, and may compare first distance information about the first external device with second distance information about the second external device. Information about the angle between the electronic device 101 and the first external device and information about the distance therebetween are related to the first external device, and may be referred to as the first angle information and the first distance information to distinguish from angle information and distance information related to the second external device. Information about the angle between the electronic device 101 and the second external device and information about the distance therebetween may be referred to as the second angle information and the second distance information.

In operation 1407, the processor 120 may determine whether pieces of angle information are similar to each other within a reference value. When the first angle information and the second angle information are similar within the reference value (e.g., 1° to 3°), the processor 120 may determine that the first external device and the second external device are located in the same line based at least in part on the electronic device 101. For example, the first external device may be located slightly closer to the electronic device 101, and the second external device may be located behind the first external device to be located slightly further away from the electronic device 101.

When the pieces of angle information are similar to each other within the reference value, the processor 120 may perform operation 1409, and when the pieces of angle information are not similar to each other within the reference value, the processor 120 may perform operation 1413.

When the pieces of angle information are similar to each other within the reference value, the processor 120 may report a location change of the electronic device 101 in operation 1409. The processor 120 may provide a user interface for requesting a change of the location of the electronic device 101. The user interface may be configured as at least one of text, an image, a video, or a voice. The processor 120 may display the user interface for the location change on a display (e.g., the display 160 of FIG. 1) or may output the user interface to a sound output module (e.g., the sound output module 155 of FIG. 1). Alternatively, the processor 120 may further reduce the positioning angle or may identify whether an external device selected by a user is correct.

In operation 1411, the processor 120 may receive a UWB signal from the external devices as the location change of the electronic device 101 is detected. The processor 120 may detect the location change of the electronic device 101, based at least in part on sensor data obtained through the sensor module 176. When the UWB signal is received, the processor 120 may return to operation 1403. The processor 120 may return to operation 1403, and may obtain angle information or distance information, based at least in part on the angle information or time information (or timestamp) included in the UWB signal. The processor 120 may provide more accurate information about the external devices, based at least in part on the angle information or distance information obtained from the external devices at the changed location of the electronic device 101 along with the angle information or distance information obtained before the location change of the electronic device 101.

When the pieces of angle information are not similar to each other within the reference value, the processor 120 may display the external devices in operation 1413. When the plurality of external devices is retrieved but the pieces of angle information are not similar to each other within the reference value, the processor 120 may display the external devices to allow the user to select an external device.

In operation 1415, the processor 120 may select an external device, based at least in part on a user input. The user may select at least one external device among the displayed external devices. The processor 120 may transmit data to the selected external device. For data transmission, Bluetooth or Wi-Fi may be used. Alternatively, the user may request re-retrieval instead of selecting an external device.

According to various embodiments, the processor 120 may select an external device in further consideration of context information. The context information may be identifying an external device (e.g., a speaker) required for an actual service (e.g., music playback). For example, the first external device (e.g., a TV) and the second external device (e.g., a speaker) may have similar azimuths and different elevations. Alternatively, the first external device (e.g., the TV) and the second external device (e.g., the speaker) may have similar elevations and different azimuths. When a music playback application is being executed in the electronic device 101, the processor 120 may select the speaker as an external device. Alternatively, when a video streaming application is being executed in the electronic device 101, the processor 120 may select the TV as an external device.

According to various embodiments, the processor 120 may select an external device in further consideration of user preference based at least in part on the context information. For example, in a case where the user has a history of frequently selecting the first external device (e.g., a speaker) when executing the music playback application, if the first external device (e.g., the speaker) and the second external device (e.g., a speaker) have similar azimuths and elevations, the first external device may be selected as an external device.

FIG. 15A and FIG. 15B illustrate examples of retrieving an external device by changing the location of an electronic device according to various embodiments.

Referring to FIG. 15A, a processor (e.g., the processor 120 of FIG. 1) of the electronic device (e.g., the electronic device 101 of FIG. 1) according to various embodiments may retrieve a plurality of external devices included in a UWB communication-perceivable range corresponding to the front of the electronic device 101. Alternatively, the processor 120 may retrieve a plurality of external devices included in a positioning angle θ smaller than the UWB communication-perceivable range (1510). The plurality of external devices may include a first external device 601 and a second external device 603. The processor 120 may compare angle information or distance information about the first external device 601 and angle information or distance information about the second external device 603.

The processor 120 may compare first angle information about the first external device 601 with second angle information about the second external device 603, and may compare first distance information about the first external device 601 with second distance information about the second external device 603. The processor 120 may measure the slope of the electronic device 101, based at least in part on sensor data obtained through an acceleration sensor or a gyro sensor (e.g., the sensor module 176 of FIG. 1) included in the electronic device 101, and may use the slope of the electronic device 101 for reference when comparing (or obtaining) the pieces of angle information.

The processor 120 may determine whether the first angle information a about the first external device 601 and the second angle information R about the second external device 603 are similar to each other within a reference value. When the pieces of angle information are similar to each other within the reference value, the processor 120 may report a location change of the electronic device 101. The processor 120 may provide a user interface for requesting a change of the location of the electronic device 101. The processor 120 may receive a UWB signal from the external devices as the location change of the electronic device 101 is detected (1530). When the UWB signal is received, the processor 120 may obtain angle information or distance information, based at least in part on angle information or time information (or timestamp) included in the UWB signal. The processor 120 may provide more accurate information about the external devices, based at least in part on the angle information or distance information obtained from the external devices at the changed location of the electronic device 101 along with the angle information or distance information obtained before the location change of the electronic device 101.

For example, the processor 120 may compare (1550) a timestamp obtained from the first external device 601 and a timestamp obtained from the second external device 603 at the changed location of the electronic device 101, thereby providing more accurate information about the external devices. Since a time difference occurs between the received timestamps according to a distance difference between the first external device 601 and the second external device 603, the processor 120 may infer the distance to the first external device 601 or the second external device 603, based at least in part on the difference between times at which the timestamps are received.

Referring to FIG. 15B, the processor 120 may provide a first user interface 1570 for selecting the plurality of external devices. The processor 120 may provide the first user interface 1570 for selecting the plurality of external devices, based at least in part on the angle information or distance information obtained before the location change of the electronic device 101. Alternatively, the processor 120 may provide a second user interface 1590 for selecting the plurality of external devices, based at least in part on the angle information or distance information obtained from the external devices at the changed location of the electronic device 101. The second user interface 1590 may further include more accurate information than the first user interface 1570.

Figure 16A:
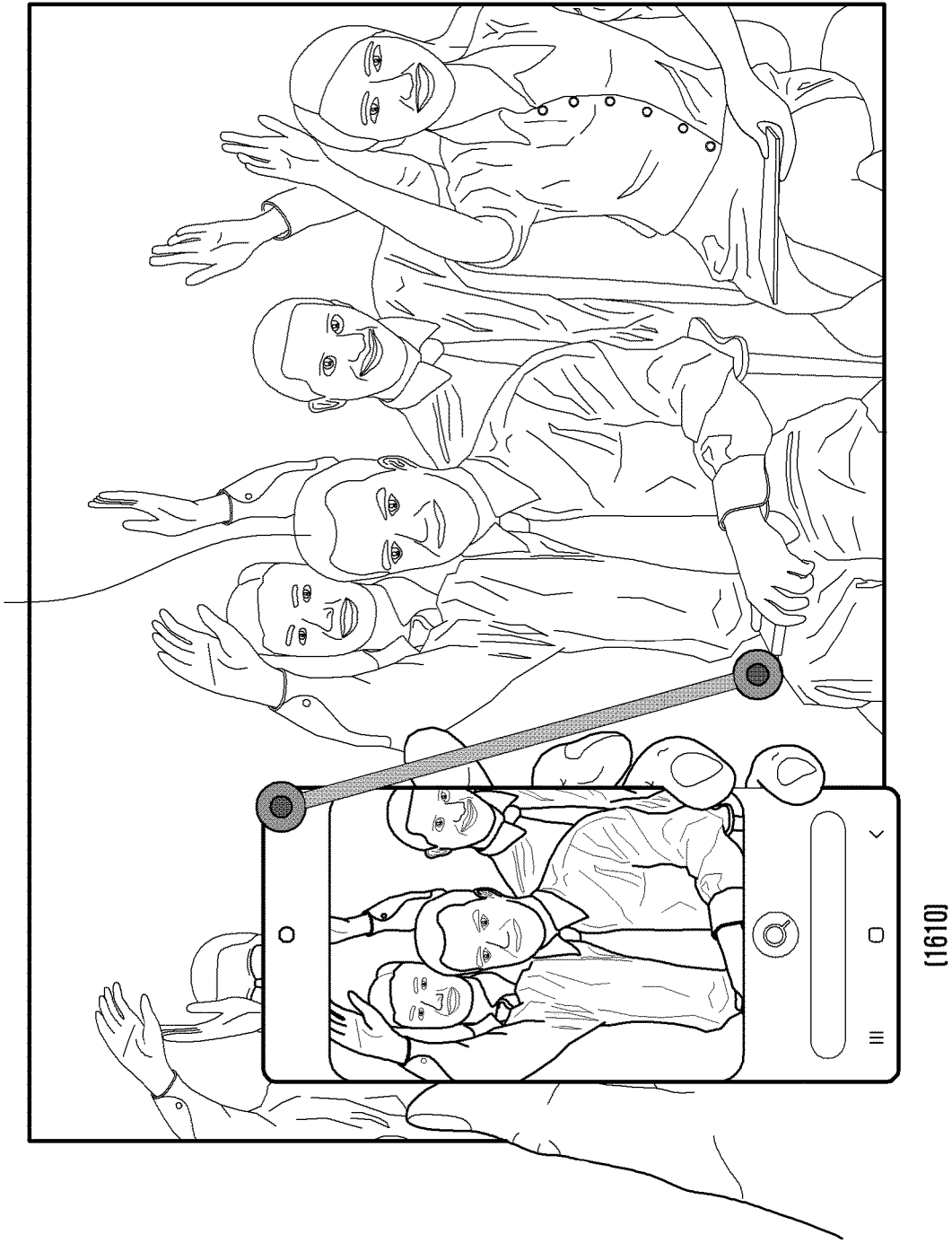
FIG. 16A and FIG. 16B illustrate examples in which an electronic device selects an external device according to various embodiments.
Figure 16B:
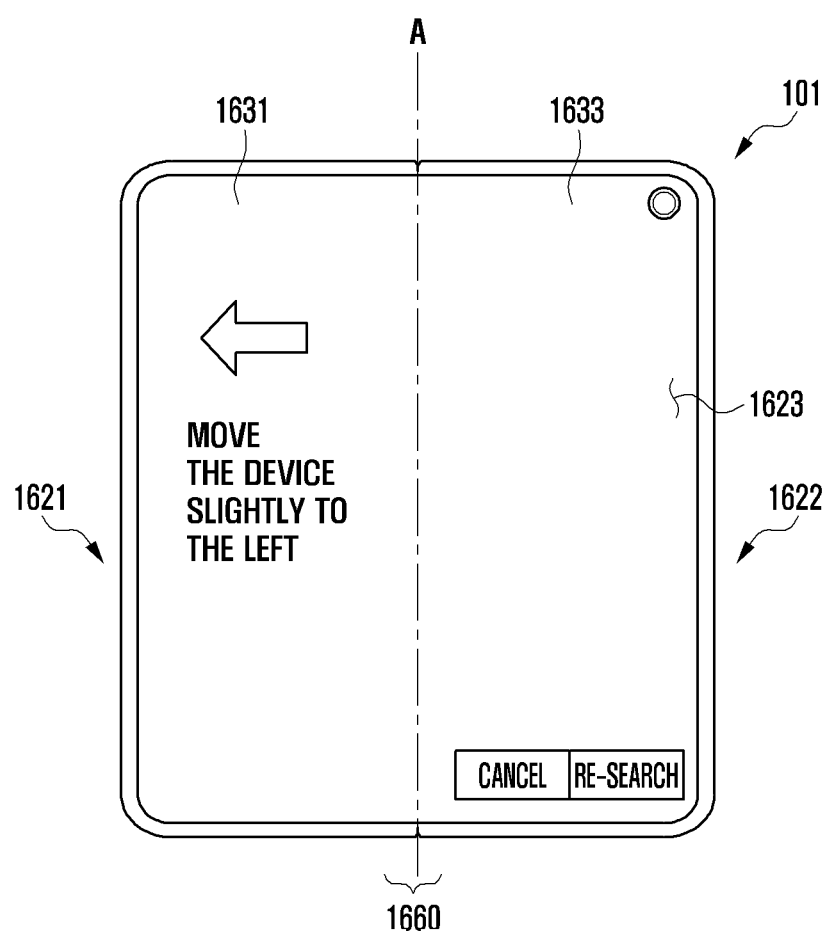

FIG. 16A and FIG. 16B illustrate examples in which an electronic device selects an external device according to various embodiments.

Referring to FIG. 16A, an instructor conducts a question-and-answer session with seated students in a lecture room. Here, the instructor may execute an attendance book application of the electronic device (e.g., the electronic device 101 of FIG. 1) (e.g., prepare for UWB communication), and may point (1610) at a student 1601 of a name that the instructor wants to know. The electronic device 101 may establish and perform UWB communication with external devices (e.g., electronic devices owned by the students) included in a UWB communication-perceivable range corresponding to the front of the electronic device 101, and may retrieve and display at least one external device. The electronic device 101 may retrieve the electronic devices owned by the students, and may display the students' names as information about the external devices.

According to various embodiments, the electronic device 101 may select a nearby student, based at least in part on distances to the external devices, but may display information enabling a switch to a student behind. The electronic device 101 may display an external device list including all retrieved external devices (e.g., electronic devices of a plurality of students), and a user may variously select a desired external device from the external device list according to a short distance, a long distance, or context information.

Referring to FIG. 16B, the electronic device 101 may include a first housing 1621 and a second housing 1622 disposed on both sides with respect to a folding axis (e.g., A) and formed to be folded with respect to each other. A hinge structure 1660 may be formed between the first housing 1621 and the second housing 1622 so that a front surface of the electronic device 101 may be folded. The electronic device 101 may include a flexible display 1623 spanning the first housing 1621 and the second housing 1622. When an external device included in a UWB communication-perceivable range is not retrieved or an external device included in a positioning angle is not retrieved, the electronic device 101 may display a user interface for requesting user identification. In a state in which the first housing 1621 and the second housing 1622 are open, the electronic device 101 may display a user interface for a location change in a first display area 1631 corresponding to the first housing 1621 and a user interface for identifying whether to cancel retrieval of an external device or re-retrieve an external device in a second display area 1633 corresponding to the second housing 1622.

When the first housing 1621 and the second housing 1622 face each other in a closed state (not shown), the electronic device 101 may report the direction change of the electronic device 101.

According to various embodiments, an external device (e.g., an electronic board) within a store broadcasts a BLE signal, and when a user who owns the electronic device 101 enters the store, the electronic device 101 may perceive the broadcast BLE signal and may prepare for UWB communication. The user may point at any one ordering menu among a plurality of ordering menus (e.g., an electronic board) in the store with the electronic device 101 while walking to an ordering counter to place an order. The plurality of ordering menus may include a location tag, and the electronic device 101 may retrieve the plurality of ordering menus through UWB communication. The electronic device 101 corresponds to a long distance, based at least in part on distance information obtained from the ordering menus through UWB communication, and may thus repeat UWB communication by repeatedly reducing the positioning angle until any one ordering menu is left. When any one ordering menu is identified, the electronic device 101 may display information (e.g., a drink menu list) included in the ordering menu.

According to various embodiments, the user who owns the electronic device 101 may enter a house, and may sit on a sofa to watch TV in a living room. When entering the house, the electronic device 101 may be connected to Wi-Fi installed in the house, and may be connected to an external device connectable through Bluetooth. The electronic device 101 may recognize that the user stays in the living room, based at least in part on information about the connected external device or location information about the external device, and may prepare for UWB communication. When the user points the electronic device 101 at the TV to control the TV, a UWB signal from the TV is transmitted from a lower right corner of the TV, and thus the TV may not be included in a positioning angle. Since the electronic device 101 corresponds to a short distance, based at least in part on distance information obtained from the TV by performing UWB communication with the TV, the electronic device 101 may repeat UWB communication by repeatedly increasing the positioning angle until the TV is included in the positioning angle. When the TV is included in the positioning angle, the electronic device 101 displays the TV so that the user may select the TV.

According to various embodiments, an external device, such as a TV, an air conditioner, a set-top box, or a wall pad, is always supplied with power, and may thus always transmit a UWB advertisement signal. When the user sitting on the sofa in the living room executes an application (e.g., a preset application for UWB advertisement communication) through the electronic device 101 and points the electronic device 101 at the TV, the electronic device 101 may receive an advertisement signal from the TV, and may identify whether the TV is included in the positioning angle. Since the UWB signal is transmitted from the lower right corner of the TV, the TV may not be included in the positioning angle. The electronic device 101 may gradually increase the positioning angle until one external device is retrieved within the positioning angle. When the TV satisfies a condition for a predetermined time or a predetermined number of times, the application of the electronic device 101 may provide a screen necessary for TV control to the user.

According to various embodiments, when the user points the electronic device 101 at the air conditioner, the TV and the air conditioner may be included in the positioning angle due to the already increased positioning angle. After determining that the electronic device 101 is located at a long distance by referring to signal strength of UWB information received from the air conditioner, the electronic device 101 may reduce the positioning angle by an offset, may identify whether the TV is excluded from candidates and only the air conditioner is included, and may then provide a screen necessary for controlling the air conditioner to the user.

According to various embodiments, when the user points the electronic device 101 at the wall pad on a wall of the living room, the electronic device 101 may display information about a boiler, a light, or a fan and additional information that are controllable on the wall pad. In an embodiment, when the user points the electronic device 101 at the wall pad on the wall of the living room, the electronic device 101 may receive a URL related to the foregoing pieces of information from the wall pad, and may display the pieces of information, based on the URL.

According to various embodiments, the user (e.g., an instructor) who owns the electronic device 101 enters a classroom, and following students may possess an external device that transmits a UWB advertisement signal. Current classroom information, lecture information, instructor information, student information, or information for UWB advertisement communication may be updated to the electronic device 101 and the external devices through Wi-Fi located in the classroom. When information update is completed, the external devices may transmit an advertisement signal based on the updated information. The instructor may receive a question a student during the class, in which case when the instructor points the instructor's electronic device 101 at the inquiring student, the electronic device 101 may display an external device list, based on external devices of the student and surrounding students. The electronic device 101 may gradually reduce the positioning angle until one external device is left in the positioning angle range. When the one external device satisfies a condition for a predetermined time or a predetermined number of times, the electronic device 101 may display information about the corresponding student based on the one external device.

An operating method of an electronic device (e.g., the electronic device 101 of FIG. 1) according to various embodiments of the disclosure may include performing UWB communication through a communication module (e.g., the communication module 190 of FIG. 1) included in the electronic device, retrieving at least one external device corresponding to a perceivable range of the UWB communication, based at least in part on the UWB communication, determining whether a configured condition including at least one of whether the retrieved external device is within a positioning angle smaller than the perceivable range, whether a number of retrieved external devices corresponds to a configured number, or whether a distance between the electronic device and the retrieved external device is a configured distance is satisfied, performing an operation related to the retrieved external device when the retrieved external device corresponds to the configured condition, and re-retrieving an external device by changing the positioning angle when the retrieved external device does not correspond to the configured condition.

According to an embodiment, the positioning angle may be configured based at least in part on a table generated with a distance value, an RSSI, and an SNR, and may include an azimuth and an elevation, and the re-retrieving may include re-retrieving the at least one external device by changing at least one of the azimuth or the elevation of the positioning angle when the retrieved external device does not correspond to the configured condition.

According to an embodiment, the changing may include increasing the positioning angle when the number of retrieved external devices does not correspond to the configured number, and reducing the positioning angle when the number of retrieved external devices exceeds the configured number, and the configured number used to increase or reduce the positioning angle may be configured to be the same or different.

According to an embodiment, the determining may include determining that the retrieved external device satisfies the configured condition when the retrieved external device is within the positioning angle and the number of retrieved external devices within the positioning angle corresponds to the configured number.

According to an embodiment, the determining may include determining that the retrieved external device does not satisfy the configured condition when the retrieved external device is not within the positioning angle and the distance to the retrieved external device corresponds to the configured distance.

According to an embodiment, determining may include determining that the configured condition is not satisfied when a distance of a first external device within the positioning angle is longer than a distance of a second external device outside the positioning angle.

According to an embodiment, the changing may include changing the positioning angle differently corresponding to a first external device and a second external device when a distance of the first external device within the positioning angle is longer than a distance of the second external device outside the positioning angle.

The embodiments disclosed in the specification and drawings are only intended to provide specific examples for easily describing the technical content of the disclosure and for assisting understanding of the disclosure, and are not intended to limit the scope of the disclosure. Therefore, it should be interpreted that the scope of the disclosure includes all changes or modifications derived based on the technical idea of the disclosure in addition to the embodiments disclosed herein.

What is claimed is:

1. An electronic device comprising:
   a display;
   a communication module;
   a memory storing instructions; and
   a processor,
   wherein the instructions, when executed by the processor, cause the electronic device to:
      perform ultra-wideband (UWB) communication through the communication module,
      retrieve at least one external device corresponding to a perceivable range of the UWB communication, based at least in part on the UWB communication,
      determine whether a configured condition comprising at least one of whether the retrieved external device is within a positioning angle smaller than the perceivable range, whether a number of the retrieved external device corresponds to a configured number, or whether a distance between the electronic device and the retrieved external device is a configured distance,
      perform an operation related to the retrieved external device when the retrieved external device satisfies the configured condition, and
      re-retrieve an external device by changing last one of an azimuth or an elevation of the positioning angle, when the retrieved external device does not satisfy the configured condition,
   wherein the positioning angle is configured based at least in part on a table generated with a distance value, a received signal strength indication (RSSI), and a signal-to-noise ratio (SNR), and the positioning angle comprises the azimuth and/or the elevation.

2. The electronic device of claim 1, wherein when adjusting the position angle, when executed by the processor, cause the electronic device to:
   increase the positioning angle when the number of the retrieved one or more external devices does not correspond to the configured number; and
   reduce the positioning angle when the number of the retrieved one or more external devices exceeds the configured number.

3. The electronic device of claim 1, wherein the instructions, when executed by the processor, cause the electronic device to:
   determine that the retrieved external device satisfies the configured condition when the retrieved external device is within the positioning angle and the number of the retrieved external device within the positioning angle corresponds to the configured number.

4. The electronic device of claim 1, wherein the instructions, when executed by the processor, cause the electronic device to:
   determine that the retrieved external device does not satisfy the configured condition when the retrieved external device is not within the positioning angle and the distance between the electronic device and the retrieved external device corresponds to the configured distance.

5. The electronic device of claim 1, wherein the instructions, when executed by the processor, cause the electronic device to:
   determine that the configured condition is not satisfied when a distance to a retrieved first external device within the positioning angle is longer than a distance to a retrieved second external device outside the positioning angle.

6. The electronic device of claim 1, wherein the instructions, when executed by the processor, cause the electronic device to:
   obtain information about a distance to the retrieved external device based at least in part on a type of the UWB communication.

7. The electronic device of claim 1, wherein the instructions, when executed by the processor, cause the electronic device to:
   perform the UWB communication in response to receiving a data transmission request from a user.

8. The electronic device of claim 1, wherein when adjusting the position angle, the instructions when executed by the processor, cause the electronic device to:
   adjust the positioning angle based at least in part on context information about the electronic device, wherein the context information is generated based at least in part on an application executed in the electronic device.

9. The electronic device of claim 8, wherein when performing the operation related to the retrieved external device, the instructions, when executed by the processor, to cause the electronic device to:
    select the retrieved external device within the positioning angle.

10. The electronic device of claim 1, wherein when adjusting the position angle, the instructions, when executed by the processor, cause the electronic device to:
    adjust the positioning angle based at least in part on a distance to a retrieved first external device not within the positioning angle, when a distance to the retrieved first external device corresponds to the configured distance, and a retrieved second external device within the positioning angle is identified.

11. The electronic device of claim 1, wherein when adjusting the position angle, the instructions, when executed by the processor, cause the electronic device to:
    adjust the positioning angle differently based at least in part on a retrieved first external device and a retrieved second external device when a distance to the retrieved first external device within the positioning angle is longer than a distance to the retrieved second external device outside the positioning angle.

12. The electronic device of claim 1, wherein the instructions, when executed by the processor, cause the electronic device to:
    request a change of a location of the electronic device when two or more external devices are retrieved, and angle information between the electronic device and the two or more retrieved external device is similar within a configured reference value;
    receive a UWB signal from the two or more retrieved external device as detecting the change of the location of the electronic device; and
    determine whether the configured condition is satisfied, based at least in part on the received UWB signal.

13. The electronic device of claim 1, wherein when adjusting the position angle, the instructions, when executed by the processor, cause the electronic device to:
    increase the positioning angle by applying a first offset to the positioning angle when the retrieved one or more external devices are not within the positioning angle; and
    reduce the positioning angle by applying a second offset to the positioning angle when the number of the retrieved one or more external devices within the positioning angle exceeds the configured number.

14. The electronic device of claim 13, wherein when determining whether the configured condition is satisfied by the retrieved external device, the instructions, when executed by the processor, cause the electronic device to:
    identify whether the configured condition is satisfied by repeating an operation of applying the first offset or the second offset to the positioning angle a specified number of times.

15. An operating method of an electronic device, comprising:
    performing ultra-wideband (U W B) communication through a communication module of the electronic device;
    retrieving at least one external device corresponding to a perceivable range of the UWB communication, based at least in part on the UWB communication;
    determining whether a configured condition comprising at least one of whether the retrieved external device is within a positioning angle smaller than the perceivable range, whether a number of the retrieved external device corresponds to a configured number, or whether a distance between the electronic device and the retrieved external device is a configured distance;
    performing an operation related to the retrieved external device when the retrieved external device satisfies the configured condition; and
    re-retrieving an external device by changing at least one of an azimuth or an elevation of the positioning angle when the retrieved external device does not satisfy the configured condition,
    wherein the positioning angle is configured based at least in part on a table generated with a distance value, a received signal strength indication (RSSI), and a signal-to-noise ratio (SNR), and the positioning angle comprises the azimuth and/or the elevation.

16. The method of claim 15, wherein the adjusting the positioning angle comprises:
    increasing the positioning angle when the number of the retrieved one or more external devices does not correspond to the configured number; and
    reducing the positioning angle when the number of the retrieved one or more external devices exceeds the configured number.

17. The method of claim 15, wherein the determining whether the configured condition is satisfied comprises:
    determining that the retrieved external device satisfies the configured condition when the retrieved external device is within the positioning angle and the number of the retrieved one or more external devices within the positioning angle corresponds to the configured number.

18. The method of claim 15, wherein the determining whether the configured condition is satisfied comprises:
    determining that the retrieved one or more external devices do not satisfy the configured condition when the retrieved one or more external devices are not within the positioning angle and the distance between the electronic device and the retrieved one or more external devices corresponds to the configured distance.

* * * * *